(12) United States Patent
Nagura et al.

(10) Patent No.: US 11,946,780 B2
(45) Date of Patent: Apr. 2, 2024

(54) OPTICAL ENCODER AND CONTROL APPARATUS

(71) Applicant: CANON KABUSHIKI KAISHA, Tokyo (JP)

(72) Inventors: Chihiro Nagura, Kanagawa (JP); Takanori Uemura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 17/337,918

(22) Filed: Jun. 3, 2021

(65) Prior Publication Data

US 2021/0381856 A1    Dec. 9, 2021

(30) Foreign Application Priority Data

Jun. 8, 2020  (JP) .................. 2020-099491

(51) Int. Cl.
 *G01D 5/30* (2006.01)
 *G01B 11/26* (2006.01)
 *G01D 5/28* (2006.01)

(52) U.S. Cl.
 CPC .............. *G01D 5/30* (2013.01); *G01B 11/26* (2013.01); *G01D 5/285* (2013.01)

(58) Field of Classification Search
 CPC ...... G01D 5/30; G01D 5/285; G01D 5/34792; G01D 5/38; G01D 5/34707; G01D 5/34746; G01B 11/26
 USPC ............................................... 356/614–624
 See application file for complete search history.

(56) References Cited

U.S. PATENT DOCUMENTS

| | | | | |
|---|---|---|---|---|
| 5,621,527 A | * | 4/1997 | Kaneda | G01D 5/38 250/237 G |
| 6,229,140 B1 | * | 5/2001 | Ishizuka | G01D 5/38 250/237 G |
| 6,674,066 B1 | * | 1/2004 | Kaneda | G01D 5/36 250/237 G |

(Continued)

FOREIGN PATENT DOCUMENTS

| | | |
|---|---|---|
| DE | 693 20 716 T2 | 3/1999 |
| DE | 10 2014 212 268 B1 | 1/2016 |

(Continued)

*Primary Examiner* — Isiaka O Akanbi
(74) *Attorney, Agent, or Firm* — CANON U.S.A., INC. IP Division

(57) ABSTRACT

A scale includes a diffraction grating configured to condense diffracted light in a periodic direction of the diffraction grating in order to detect a reference position. A light receiving element array is configured to receive light from the diffraction grating. The light receiving element array includes first to fourth light receiving elements configured to output signals having phases different from each other. The first light receiving element and the second light receiving element are adjacent to each other and are arranged between the third light receiving element and the fourth light receiving element. The processing unit generates a signal representing the reference position based on a differential signal between a signal from the first light receiving element and a signal from the third light receiving element and a differential signal between a signal from the second light receiving element and a signal from the fourth light receiving element.

15 Claims, 21 Drawing Sheets

(56) References Cited

U.S. PATENT DOCUMENTS

| | | | |
|---|---|---|---|
| 7,608,813 B1* | 10/2009 | Milvich | G01D 5/34784 250/231.13 |
| 2006/0267822 A1 | 11/2006 | Ito | |
| 2007/0102630 A1* | 5/2007 | Igaki | G01D 5/38 250/231.16 |
| 2016/0209247 A1* | 7/2016 | Nagura | G01D 5/34715 |
| 2016/0231144 A1* | 8/2016 | Slack | G01D 5/366 |
| 2017/0261351 A1* | 9/2017 | Nagura | G01D 5/34746 |

FOREIGN PATENT DOCUMENTS

| | | |
|---|---|---|
| EP | 3 064 903 B1 | 6/2018 |
| JP | 2000304574 A | 11/2000 |
| JP | 2004212243 A | 7/2004 |
| JP | 2004520591 A | 7/2004 |
| JP | 2015187605 A | 10/2015 |
| JP | 2016008965 A | 1/2016 |
| JP | 2016102708 A | 6/2016 |

* cited by examiner

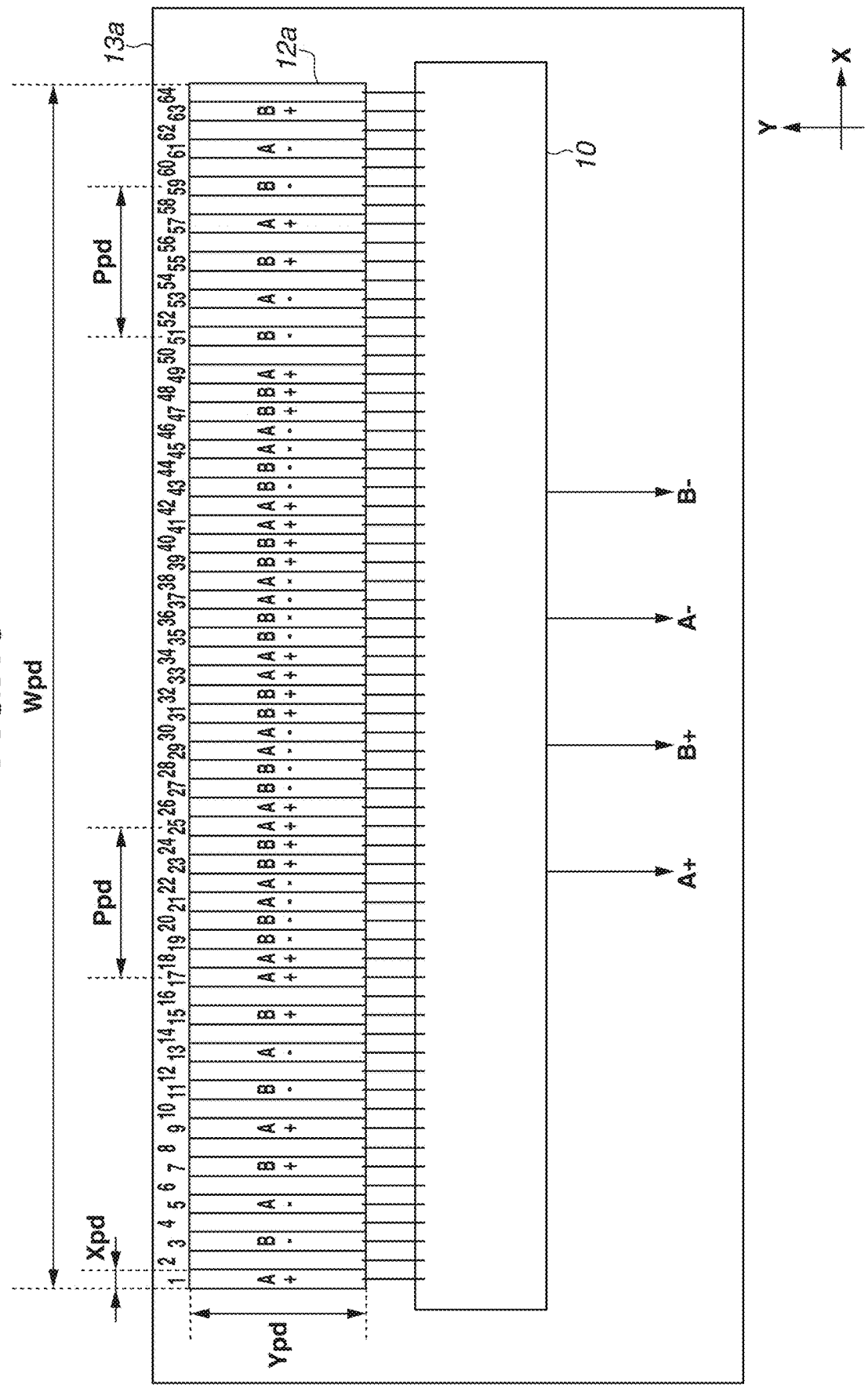

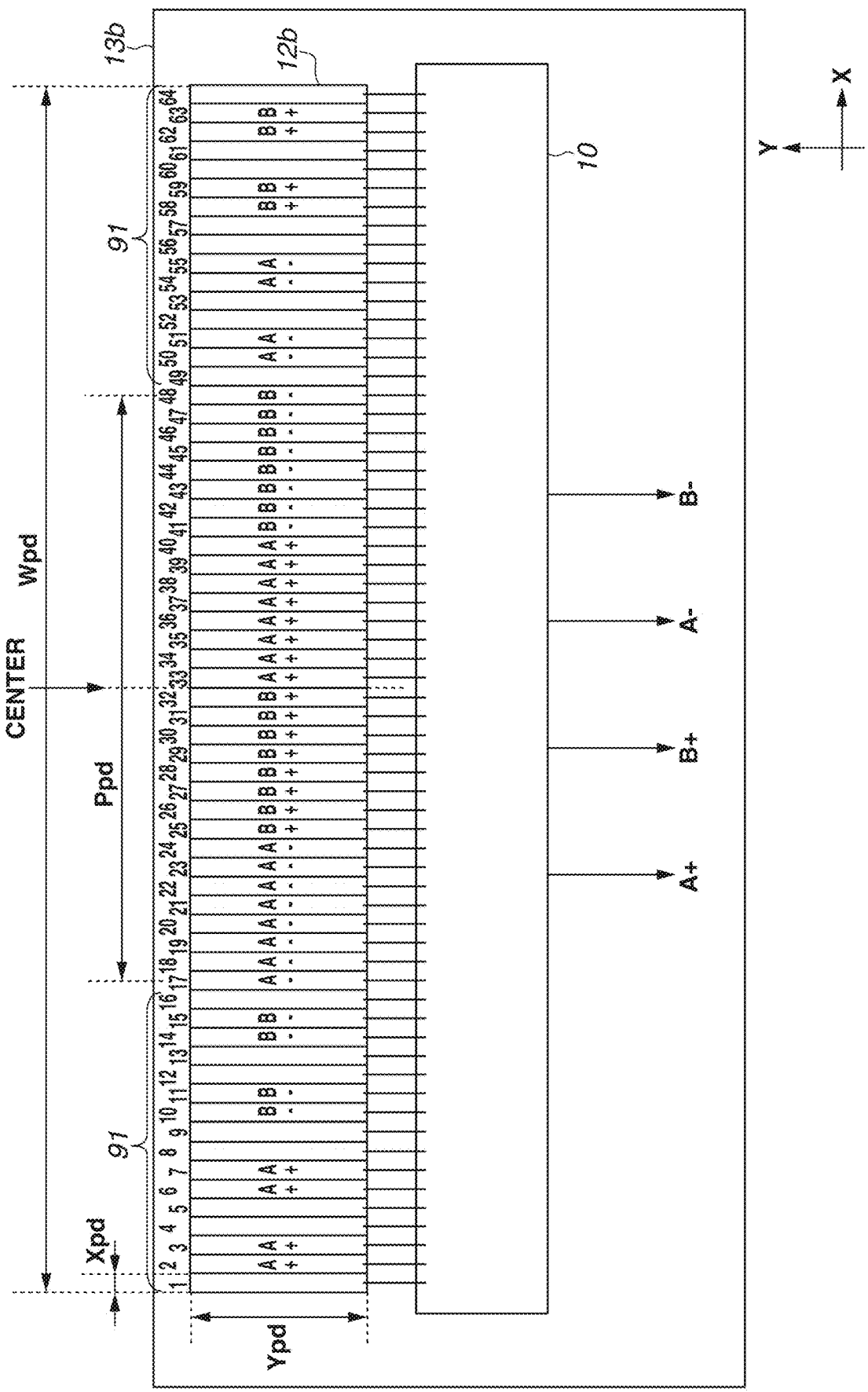

400

OPTICAL ENCODER AND CONTROL APPARATUS

BACKGROUND OF THE INVENTION

Field of the Invention

The present invention relates to optical encoders and control apparatuses.

Description of the Related Art

Encoders are conventionally used as position detection apparatuses in machining apparatuses, factory automation (FA) apparatuses, and the like. An increment type encoder detects a reference position, such as an origin, using a reference mark provided at a specific position on a scale and detects a position in a stroke based on a relative movement amount from the reference position.

Japanese Patent Application Laid-Open No. 2000-304574 discusses an encoder which detects a reference position on a scale. The encoder obtains a differential signal by a split photodiode using a diffractive lens structure and thus can perform edge detection which is resistant to noise and highly reproducible.

In the encoder discussed in Japanese Patent Application Laid-Open No. 2000-304574, a light amount is concentrated at a spot position at which the light is condensed by the diffractive lens structure, and the light amount is conversely reduced in the vicinity thereof. In a case where the reference position is detected from a light intensity distribution near the spot position, there is an issue that a detection accuracy drops due to reduction of the light amount in the vicinity.

SUMMARY OF THE INVENTION

According to an aspect of the present invention, an optical encoder includes a light source, a scale, a light receiving unit configured to receive light from the scale, and a processing unit configured to process a signal from the light receiving unit. The scale includes a diffraction grating configured to condense diffracted light in a periodic direction of the diffraction grating in order to detect a reference position. The light receiving unit includes a light receiving element array configured to receive light from the diffraction grating. The light receiving element array includes a first light receiving element, a second light receiving element, a third light receiving element, and a fourth light receiving element configured to output signals having phases different from each other. The first light receiving element and the second light receiving element are adjacent to each other and are arranged between the third light receiving element and the fourth light receiving element. The processing unit generates a signal representing the reference position based on a differential signal between a signal from the first light receiving element and a signal from the third light receiving element and a differential signal between a signal from the second light receiving element and a signal from the fourth light receiving element.

Further features of the present invention will become apparent from the following description of exemplary embodiments with reference to the attached drawings.

BRIEF DESCRIPTION OF THE DRAWINGS

FIG. 15 is a plan view of a light receiving element array according to the third exemplary embodiment.

FIG. 16 is a plan view of a light receiving element array according to the third exemplary embodiment.

DESCRIPTION OF THE EMBODIMENTS

Various exemplary embodiments of the present invention will be described in detail below with reference to the attached drawings. Each of the embodiments of the present invention described below can be implemented solely or as a combination of a plurality of the embodiments or features thereof where necessary or where the combination of elements or features from individual embodiments in a single embodiment is beneficial.

Figure 1:
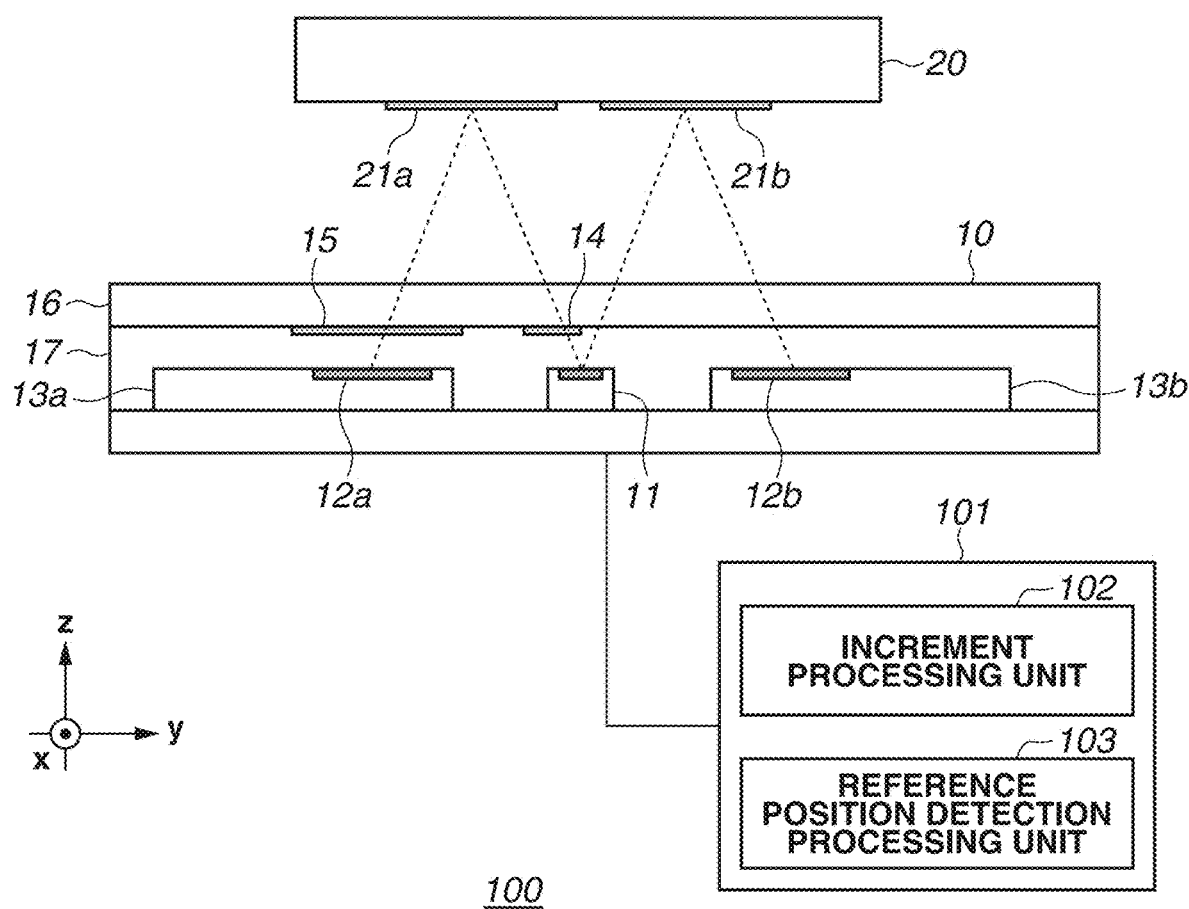
FIG. 1 is a schematic configuration diagram of a position detection apparatus according to a first exemplary embodiment.

A first exemplary embodiment of the present invention will be described below. FIG. 1 is a schematic configuration diagram illustrating an optical position detection apparatus (an optical encoder) 100 according to the first exemplary embodiment. The position detection apparatus 100 includes a scale 20 which is attached to a movable portion (an object to be measured), a sensor unit 10 (a detector) serving as a detector which is attached to a fixed portion, and a signal processing circuit 101 (a signal processing unit). According to the present exemplary embodiment, a linear encoder in which the scale 20 linearly moves in an X direction is described as an example. A relationship between the fixed portion and the movable portion may be reversed, so that the sensor unit 10 can be attached to the movable portion, and the scale 20 can be attached to the fixed portion. In other words, the sensor unit 10 and the scale 20 may be relatively movable.

The signal processing circuit 101 includes an increment processing unit 102 and a reference position detection processing unit 103 and processes a signal output from the sensor unit 10. The increment processing unit 102 performs interpolation processing and cumulative processing on an encoder signal (a position detection signal) obtained from the sensor unit 10. The reference position detection processing unit 103 detects a reference position on the scale 20. Further, as will be described below, the signal processing circuit 101 obtains a relative reference position between the scale 20 and the sensor unit 10 using a light intensity distribution (an energy distribution) obtained via a reference mark 22.

The sensor unit 10 is a light receiving and emitting integrated type sensor unit in which, for example, a light source 11 including a light emitting diode (LED, a light emitting element), a light receiving integrated circuit (IC) 13a including a light receiving element array 12a, and a light receiving IC 13b including a light receiving element array 12b are mounted in the same package. The scale 20 includes a step portion which has been processed on a quartz substrate and has been patterned as scale tracks 21a and 21b. The step portion is formed by etching to a depth of about ¼ of a wavelength of the light source, and an aluminum film serving as a reflective film and a dielectric film are laminated on a surface of the step portion.

A light source grating 14 serving as a transmission diffraction grating including transmission portions and light-shielding portions alternately arranged in the X direction is provided along an optical path from the light source 11 in the sensor unit 10 to the scale track 21a. An increment detection grating 15 is provided along an optical path from the scale track 21a to the light receiving element array 12a. The increment detection grating 15 is a transmission diffraction grating including transmission portions and light-shielding portions alternately arranged in the X direction.

A luminous flux from the light source 11 in the sensor unit 10 toward the scale track 21b is reflected by the scale track 21b and received by the light receiving element array 12b.

The light source grating 14 and the increment detection grating 15 are each provided by forming a chrome film which becomes the transmission portion on one surface of a cover glass 16. The cover glass 16 is attached to a light transmitting resin 17 for sealing the light source 11 and the light receiving ICs 13a and 13b and is fixed to be integrated with the light source 11 and the light receiving ICs 13a and 13b.

Figure 2:
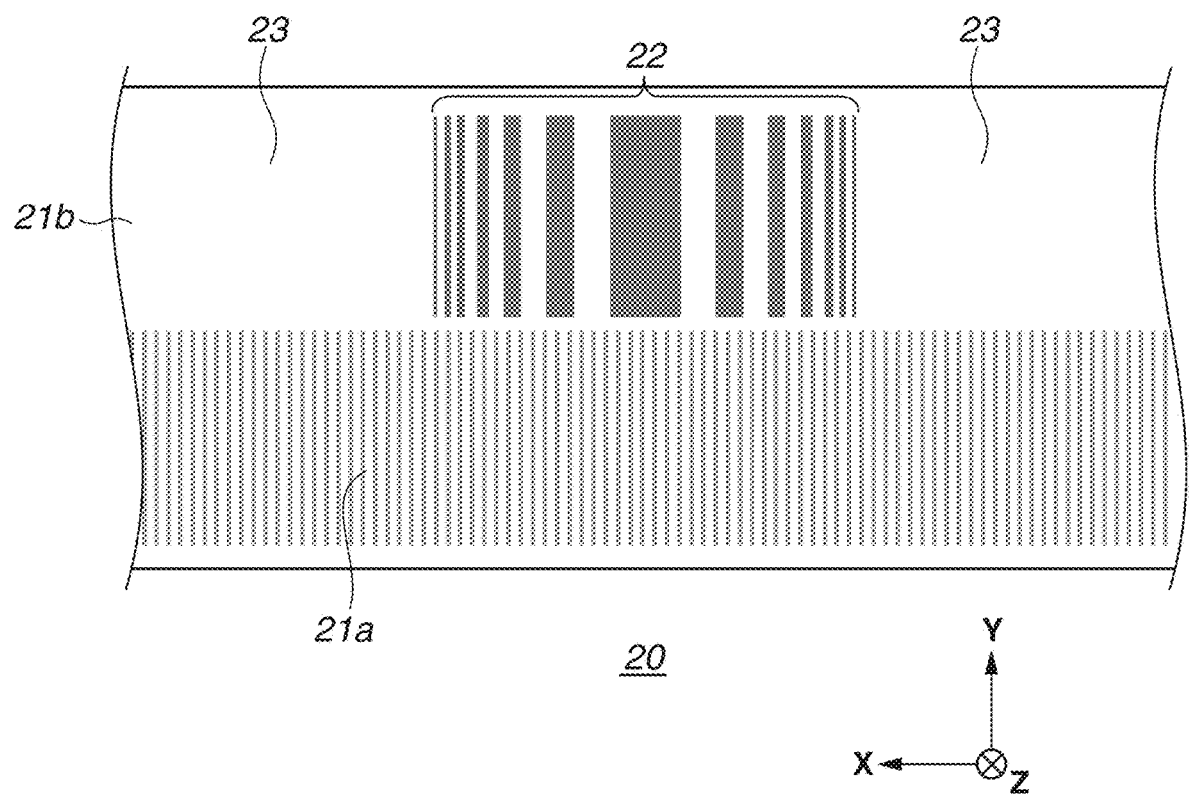
FIG. 2 is a plan view of a scale according to the first exemplary embodiment.

Next, configurations of the scale tracks 21a and 21b in the scale 20 will be described with reference to FIG. 2. FIG. 2 is a partially enlarged plan view of the scale 20 (the scale tracks 21a and 21b). In FIG. 2, portions painted with dots represent depressions in a step (projections and depressions) pattern. The scale track 21a includes a pattern row in which a depression having a width of 2 μm in a periodic direction is arranged at each period, namely each pitch of 4 μm in a movement direction (the X direction). In the scale track 21b arranged in parallel with the scale track 21a, the reference mark 22 (a reference grating, a first diffraction grating) is formed in which depressions are arranged at unequal intervals in the X direction (a periodic direction) at a specific position (the reference position) on the scale 20. The interval between the depressions is reduced as a distance from the center of the reference mark 22 increases, and a width of the depression is reduced as the distance from the center increases. Thus, the reference mark 22 has a diffractive lens structure in which a divergent luminous flux from the light source 11 converges (is condensed) linearly at a predetermined distance by diffraction in the periodic direction of the grating. The reference mark 22 is a diffraction grating for detecting the reference position, for example, an origin. A reflection portion 23 is formed using a uniform reflective film in an area other than the reference mark 22 in the scale track 21b.

Figure 3:
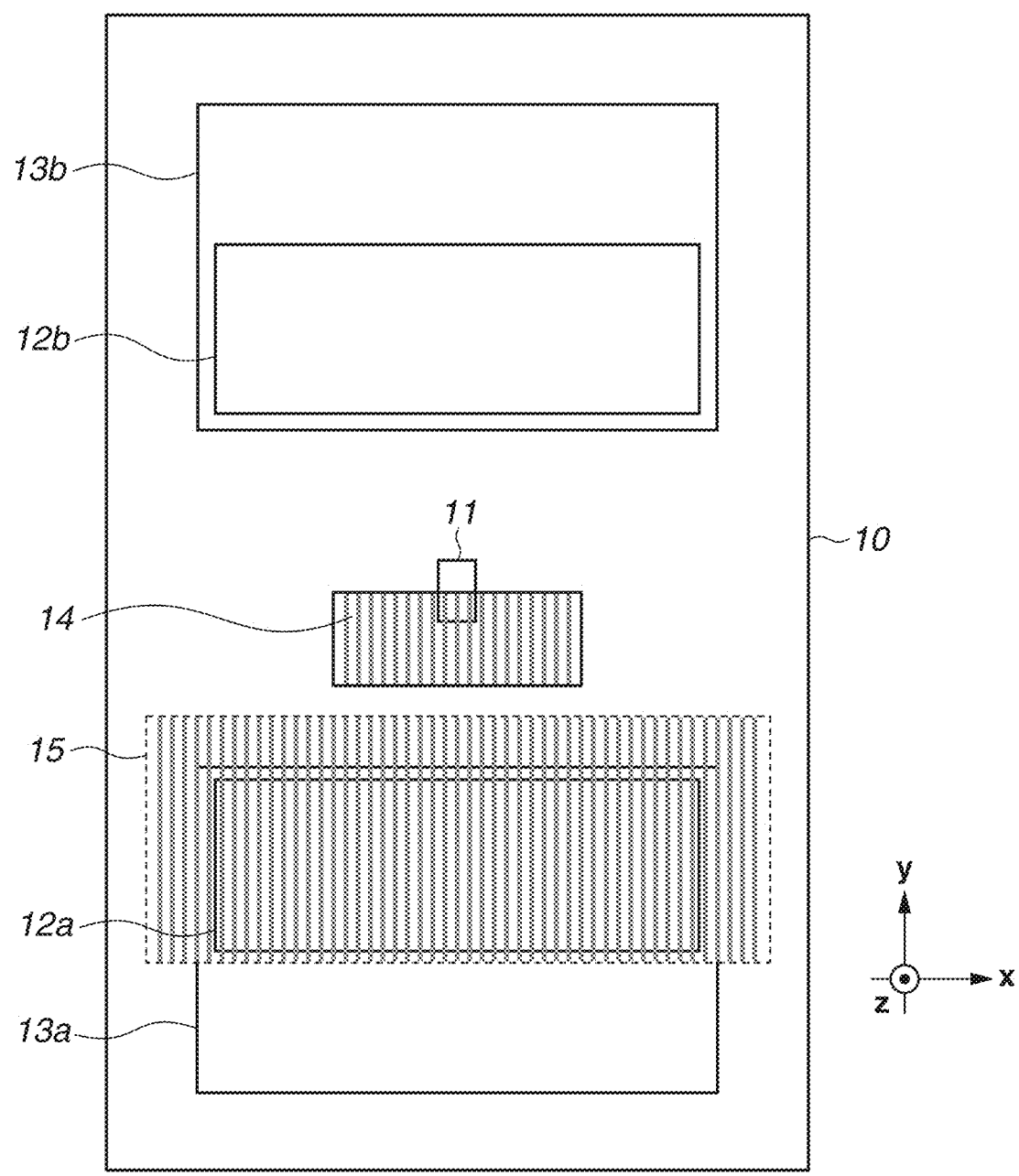
FIG. 3 is a plan view of a sensor unit according to the first exemplary embodiment.

Next, a configuration of the sensor unit 10 will be described with reference to FIG. 3. FIG. 3 is a plan view of the sensor unit 10 viewed from the scale 20 side. A grating pattern of the light source grating 14 has a pitch (a pattern period) of 4 μm. The increment detection grating 15 includes a grating pattern having a predetermined pitch (=4.069952 μm) in the X direction.

Figure 4:
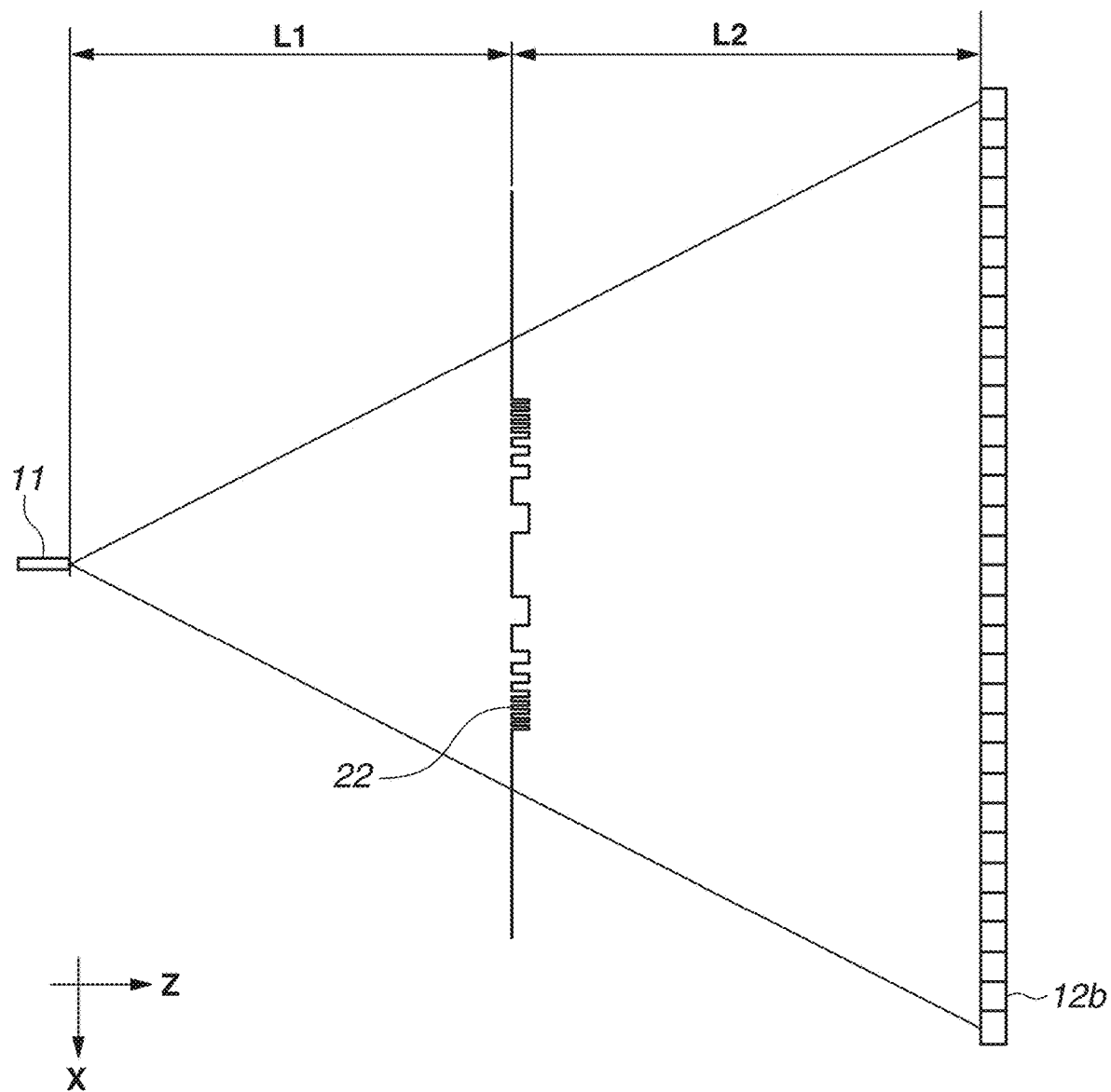
FIG. 4 is a development view of an optical path according to the first exemplary embodiment.

Next, an optical path in the position detection apparatus 100 will be described with reference to FIG. 4. FIG. 4 is a development view of the optical path in the position detection apparatus 100 in which reflection is developed as if it is transmitted. A distance L1 as an effective optical path length from the light source 11 to the reference mark 22 is set in a range of 1 mm±0.3 mm. The effective optical path length is a value obtained by dividing a physical length by a refractive index (or an approximate value thereof). A distance L2, which is an effective optical path length from the reference mark 22 to the light receiving element array 12b, is set so that L2=L1.

In the reference mark 22, an n-th boundary position counted from the center of the reference mark 22 is formed at a position Xn represented by the following equation (1).

$$X(n) = \sqrt{n \cdot f \cdot \lambda} \tag{1}$$

In the equation (1), f is a focal length of a diffractive lens, and λ is a center wavelength of the light source 11.

According to the present exemplary embodiment, f=0.5 mm and λ=650 nm. A width of the reference mark 22 corresponds to an area of ±128 μm from the center.

Alternatively, the same effect can be obtained using the following equation (2) as another design example.

$$X(n) = \sqrt{\frac{2n-1}{2} \cdot f \cdot \lambda} \tag{2}$$

Figure 5:
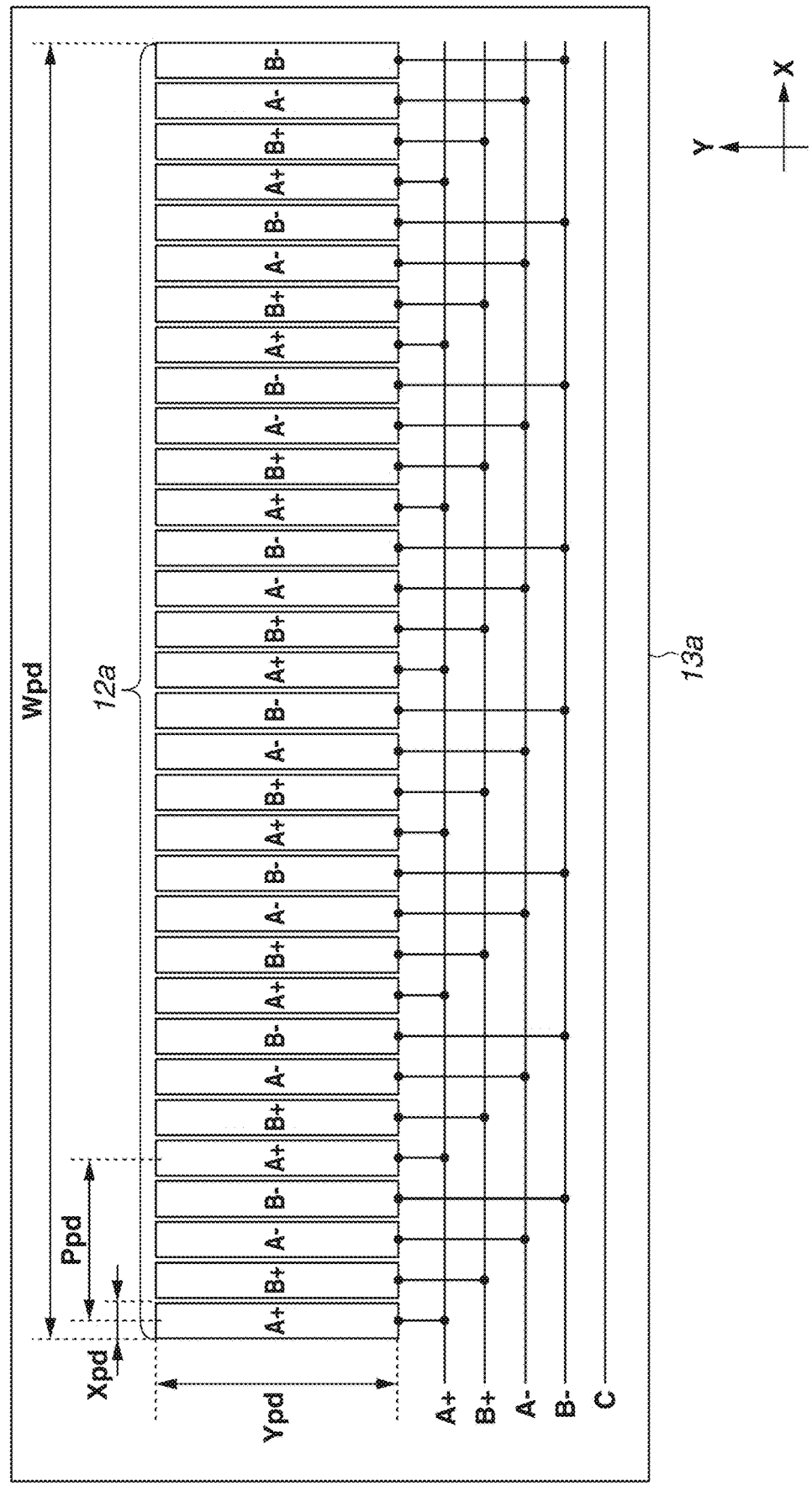
FIG. 5 is a plan view of a light receiving element array according to the first exemplary embodiment.

Next, an arrangement of the light receiving element array 12a (a light receiving unit) in the light receiving IC 13a will be described with reference to FIG. 5. FIG. 5 is a plan view of the light receiving element array 12a and illustrates the arrangement of the light receiving element array 12a on a light receiving surface. In the light receiving element array 12a, a plurality of (32 pieces of) light receiving elements is arranged in a row along the X direction. One light receiving element has a width $X_{pd}$ of 64 μm in the X direction and a width $Y_{pd}$ of 450 μm in the direction (a Y direction) perpendicular to the X direction. The light receiving element array 12a has an entire width Wpd of 2048 μm in the X direction.

The 32 light receiving elements are assigned in a circulating manner in the order of an A+ phase, a B+ phase, an A− phase, and a B− phase, and the eight light receiving elements assigned to each one of the four phases form a light receiving element group. The eight light receiving elements (first light receiving elements) are assigned to the A+ phase and form one group. The eight light receiving elements (second light receiving elements) are assigned to the B+ phase and form one group. The eight light receiving elements (third light receiving elements) are assigned to the A− phase and form one group. The eight light receiving elements (fourth light receiving element) are assigned to the B− phase and form one group. The light receiving elements (the first light receiving elements) assigned to the A+ phase and the light receiving elements (the second light receiving elements) assigned to the B+ phase are adjacent to each other. The light receiving elements (the first light receiving elements) assigned to the A+ phase and the light receiving elements (the second light receiving elements) assigned to the B+ phase are arranged between the light receiving elements (the third light receiving elements) assigned to the A− phase and the light receiving elements (the fourth light receiving elements) assigned to the B− phase. A period $P_{pd}$ (a circulation period) of the light receiving elements in the same phase is 256 μm which corresponds to a width of four light receiving elements and corresponds to a detection period of the light intensity distribution on a light receiving element surface.

The eight light receiving elements forming each light receiving element group are electrically connected to each other, and outputs (currents) of the light receiving elements are added to each other and input to a current-to-voltage (IV) conversion amplifier (not illustrated) provided for each phase in a subsequent stage. The four IV conversion amplifiers each output the corresponding one of four phase signals S1(A+), S1(B+), S1(A−), and S1(B−) having different phases. The signals S1(A+), S1(B+), S1(A−), and S1(B−) are voltage signals (sinusoidal signals) of which values change in a sinusoidal manner in accordance with a movement of the scale 20. The output signals from the four IV conversion amplifiers provided for the four phases each correspond to a different one of signal phases of 0 degrees, 90 degrees, 180 degrees, and 270 degrees. In other words, the phases of the signal from the first light receiving element and the signal from the third light receiving element are different by 180 degrees, and the phases of the signal from the second light receiving element and the signal from the fourth light receiving element are different by 180 degrees.

Further, the four phase signals S1(A+), S1(B+), S1(A−), and S1(B−) are subjected to calculations represented by the following equations (3) and (4) and converted into two phase sinusoidal signals S1(A) and S1(B) in which a direct-current (DC) component is removed from the four phase signals.

$$S1(A)=S1(A+)-S1(A-) \qquad (3)$$

$$S1(B)=S1(B+)-S1(B-) \qquad (4)$$

The two phase sinusoidal signals S1(A) and S1(B) output from the light receiving IC 13a are transmitted to the signal processing circuit 101. The increment processing unit 102 in the signal processing circuit 101 obtains a phase signal Φ1 which is a source of a position signal by performing a calculation represented by the following equation (5).

$$\Phi1=A\ TAN\ 2[S1(A),S1(B)] \qquad (5)$$

In the equation (5), A TAN 2[Y, X] is an arctangent operation function which discriminates a quadrant and converts the signal into a phase of 0 to 2π. Further, the increment processing unit 102 generates position information by accumulating amounts of change in the phase signal Φ1.

Figure 6:
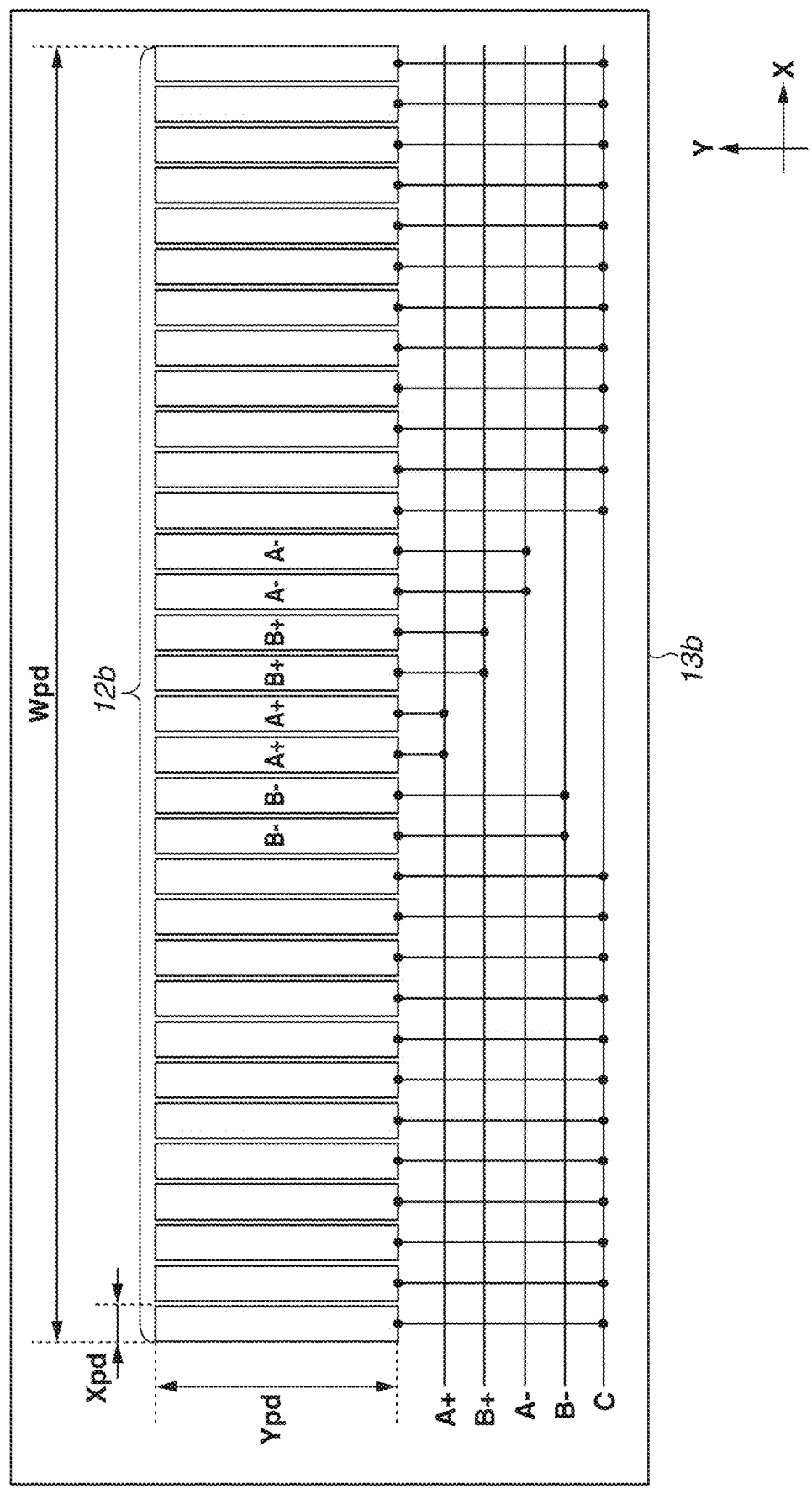
FIG. 6 is a plan view of a light receiving element array according to the first exemplary embodiment.

Next, an arrangement of the light receiving element array 12b (the light receiving unit) in the light receiving IC 13b will be described with reference to FIG. 6. FIG. 6 is a plan view of the light receiving element array 12b and illustrates the arrangement of the light receiving element array 12b on the light receiving surface. In the light receiving element array 12b, a plurality of (32 pieces of) light receiving elements is arranged in a row along the X direction. The light receiving element array 12b includes the first light receiving elements which output the B− phase signal, the second light receiving elements which output the A+ phase signal, the third light receiving elements which output the B+ phase signal, and the fourth light receiving elements which output the A− phase signal. In the light receiving element array 12b, the first light receiving element, the second light receiving element, the third light receiving element, and the fourth light receiving element are arranged in this order. One light receiving element has the width $X_{pd}$ of 64 μm in the X direction and the width $Y_{pd}$ of 450 μm in the direction perpendicular to the X direction (the Y direction). The light receiving element array 12b has the entire width Wpd of 2048 μm in the X direction.

Out of the 32 light receiving elements, the central eight light receiving elements are assigned in the order of the B− phase, the B− phase, the A+ phase, the A+ phase, the B+ phase, the B+ phase, the A− phase, and the A− phase. The two light receiving elements adjacent to each other in the same phase form one light receiving element group. The two light receiving elements forming each light receiving element group are electrically connected, and outputs (currents) thereof are added to each other and input to the IV conversion amplifier (not illustrated) provided for each phase in the subsequent stage. The four IV conversion amplifiers each output the corresponding one of four phase signals S2(A+), S2(B+), S2(A−), and S2(B−) having different phases.

Further, the light receiving IC 13b performs subtractions represented by the following equations (6) and (7) on the four phase signals S2(A+), S2(B+), S2(A−), and S2(B−) and converts the signals into two phase differential signals S2(A) and S2(B). The two phase signals S2(A) and S2(B) output from the light receiving IC 13b are transmitted to the reference position detection processing unit 103 in the signal processing circuit 101.

$$S2(A)=S2(A+)-S2(A-) \qquad (6)$$

$$S2(B)=S2(B+)-S2(B-) \qquad (7)$$

A distance D from the center of a shadow resulting from the diffraction of the reference mark 22 can be calculated using the following equation (8). In the equation (8), a distance Z1 refers to a distance from the light source 11 to the scale 20 (the distance L1 in the present exemplary embodiment), a distance Z2 refers to a distance from the scale 20 to the surface of the light receiving element array 12b (the distance L2 in the present exemplary embodiment). Further, w refers to a width of the reference mark 22.

$$D=(Z1+Z2)/Z1\times(w/2) \qquad (8)$$

A width of the shadow resulting from the diffraction of the reference mark 22 in the present exemplary embodiment corresponds to an image twice of the reference mark 22 and has ±256 μm from the center. On the other hand, the light receiving elements ("A−" and "B−" in FIG. 6) used for subtraction are in a range from −256 to −128 μm inclusive and a range from +128 to +256 μm inclusive, from the center. In other words, the light receiving element in the A− phase and the light receiving element in the B− phase are arranged at positions at which a distance X from the center of the light receiving element array satisfies X<(Z1+Z2)/Z1×(w/2). Thus, the light receiving elements arranged at the position including the shadow area of the diffractive lens structure are used for subtraction, so that a signal amplitude near the reference mark 22 can be increased. Accordingly, the reference position detection which is less likely to cause erroneous detection can be realized.

Figure 7:
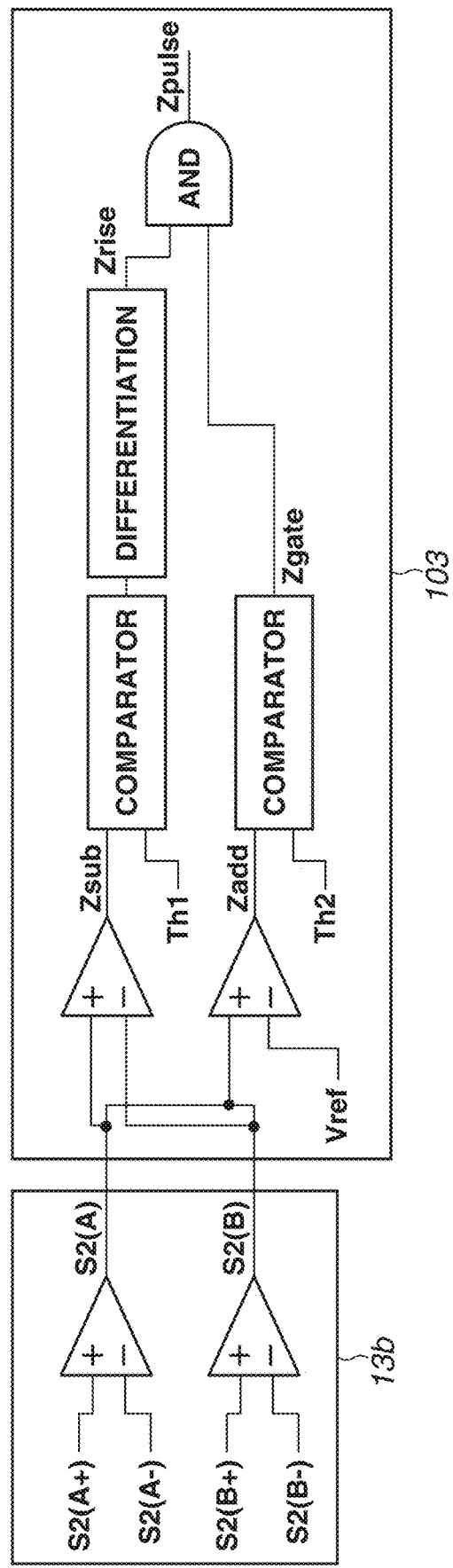
FIG. 7 is a block diagram including a signal processing unit and a light receiving integrated circuit (IC) according to the first exemplary embodiment.

Next, the reference position detection processing unit 103 in the signal processing circuit 101 will be described with reference to FIG. 7. FIG. 7 is a block diagram illustrating the reference position detection processing unit 103 and the light receiving IC 13b. The reference position detection processing unit 103 performs calculations represented by the following equations (9) and (10) on the two phase signals S2(A) and S2(B) and obtains a differential signal Zsub and an addition signal Zadd.

$$Zsub=S2(A)-S2(B) \tag{9}$$

$$Zadd=S2(A)+S2(B) \tag{10}$$

Offsets are added to both of the differential signal Zsub and the addition signal Zadd to output a reference voltage Vref as a reference. The addition signal Zadd is input to a comparator, and a binarized output which reaches a high level under the condition of the following expression (11) is generated as a gate signal Zgate.

$$Zadd>Th2 \tag{11}$$

In the expression (11), Th2 is a binarization threshold level of the comparator and is set in advance so that the high level signal is output only near the reference mark 22. The differential signal Zsub is input to the comparator, and a binarization output which reaches the high level under the condition of the following expression (12) is generated as an edge signal.

$$Zsub>Th1 \tag{12}$$

In the expression (12), Th1 is a binarization threshold level of the comparator, and, for example, the same value as the reference voltage Vref can be used. The edge signal is further input to a differentiating circuit, and a rising edge signal Zrise is output as a pulse signal having a predetermined time width at a rise of the edge signal. Further, the gate signal Zgate and the rising edge signal Zrise are input to a logical AND circuit (an AND circuit), and an origin signal Zpulse is output.

Figure 8A:
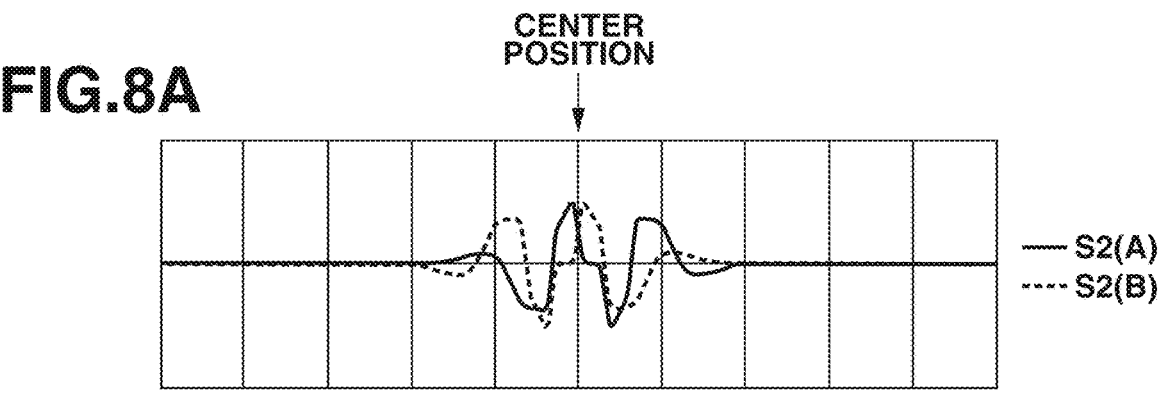
FIGS. 8A to 8D are each a diagram of signal waveforms near a reference mark according to the first exemplary embodiment.
Figure 8B:
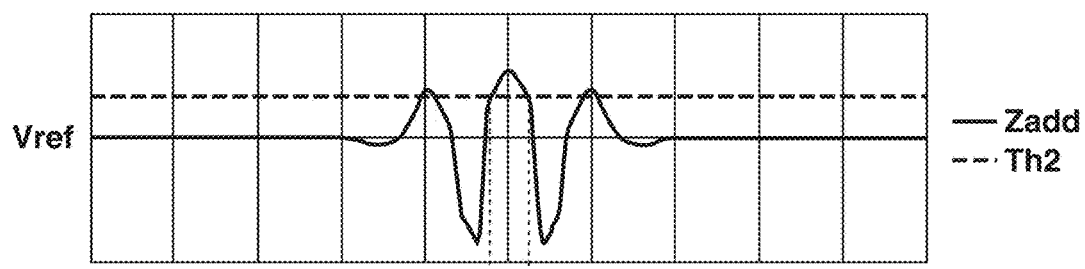

Next, each signal waveform near the reference mark 22 will be described with reference to FIGS. 8A to 8D. FIGS. 8A to 8D are each a diagram of signal waveforms near the reference mark 22 in a case where light from the reference mark 22 is detected by the light receiving element array 12b. FIG. 8A illustrates waveforms of the two phase signals S2(A) and S2(B) near the reference mark 22. FIG. 8B illustrates waveforms of the addition signal Zadd and the threshold value Th2 near the reference mark 22.

Figure 8C:
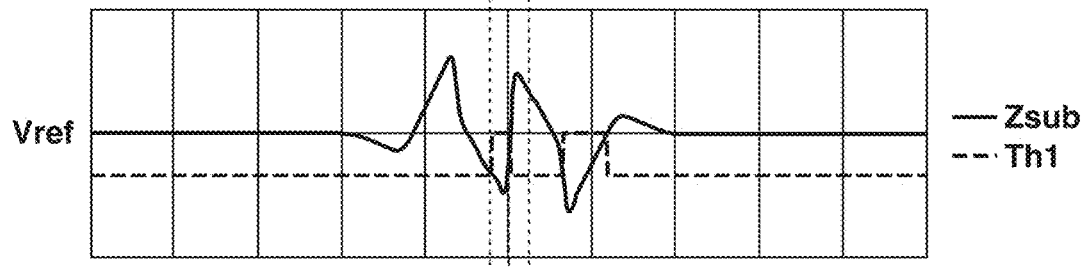

FIG. 8C illustrates waveforms of the differential signal Zsub and the threshold value Th1 near the reference mark 22. The threshold value Th1 has a hysteresis so as to be offset to a minus side when the output from the comparator becomes high. In this way, edge detection can be performed near the center of the reference mark 22 at which a signal change is steep, and unnecessary edge detection can be controlled in other areas. Controlling of the unnecessary edge detection reduces crosstalk into an increment signal.

Figure 8D:
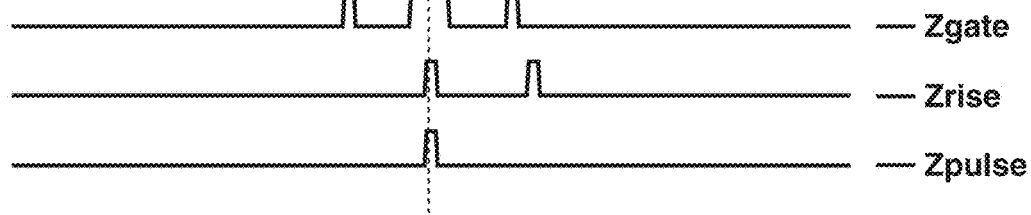

FIG. 8D illustrates waveforms of the gate signal Zgate, the rising edge signal Zrise, and the origin signal Zpulse (an origin pulse) near the reference mark 22. It can be seen that the waveform of the origin signal Zpulse (the origin pulse) indicates a center position (the reference position) of the reference mark 22. According to the present exemplary embodiment, the reference position can be detected with high accuracy even in a case where the reference mark has the diffractive lens structure.

Next, a description will be provided of a case in which the origin pulse is obtained using only two phase signal outputs as a comparative example. For the comparative example, a description will be provided of a case of using only the phase signals S2(A+) and S2(B+) among the four phase signals S2(A+), S2(B+), S2(A−), and S2(B−) output from the four IV conversion amplifiers. In the comparative example, a calculation of the following equation (13) is performed using the phase signals S2(A+) and S2(B+).

$$Zadd'=S2(A+)+S2(B+) \tag{13}$$

Figure 9A:
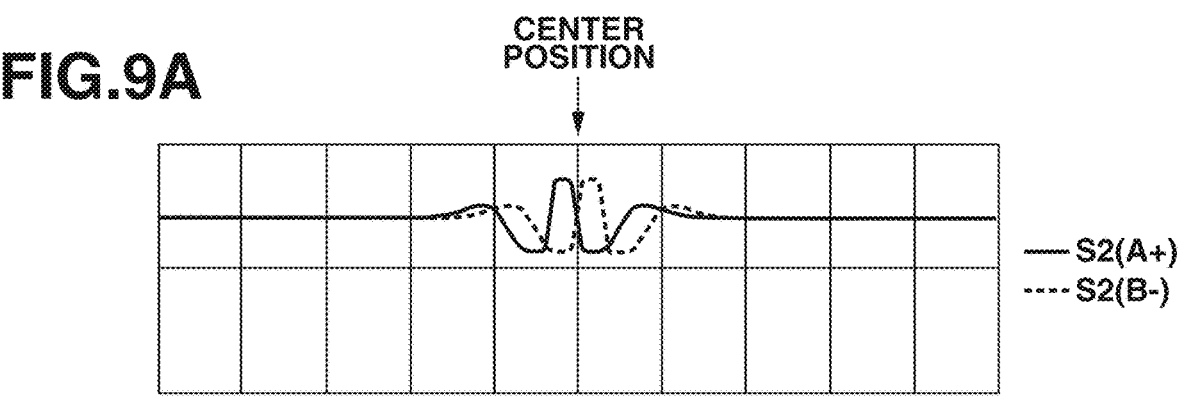
FIGS. 9A to 9C are each a diagram of signal waveform(s) near a reference mark according to a comparative example.
Figure 9B:
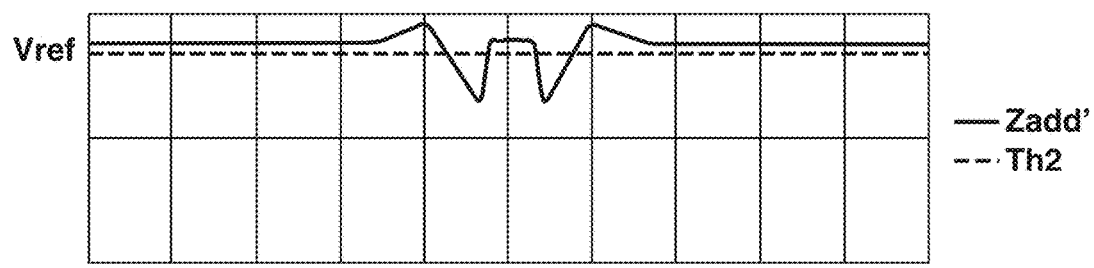
Figure 9C:
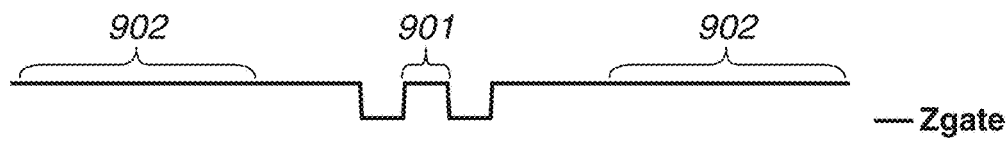

Each signal waveform near the reference mark 22 according to the comparative example will be described with reference to FIGS. 9A to 9C. FIGS. 9A to 9C are each a diagram of signal waveform(s) near the reference mark 22 in a case where the light from the reference mark 22 is detected by the light receiving element array 12b in the comparative example FIG. 9A illustrates waveforms of the two phase signals S2(A+) and S2(B+) near the reference mark 22. FIG. 9B illustrates waveforms of the addition signal Zadd' and the threshold value Th2 near the reference mark 22.

FIG. 9C illustrates a waveform of the gate signal Zgate near the reference mark 22. A value of a signal 901 near the center position of the reference mark 22 in the gate signal Zgate is about the same as the value of a signal 902 at a position of the reflection portion 23 away from the reference mark 22. For this reason, the center position of the reference mark 22 cannot be obtained with high accuracy from the gate signal Zgate. This is because a light amount is reduced in a peripheral portion other than a condensing position due to the diffractive lens structure of the reference mark 22, and it can be seen that it is not sufficient to use only the signals S2(A+) and S2(B+).

The width of the shadow resulting from the diffraction of the reference mark 22 corresponds to the image twice of the reference mark 22, so that the signals S2(A−) and S2(B−) from the light receiving elements in the A− phase and the B− phase are used in the present exemplary embodiment. Thus, the reference position of the reference mark can be detected with high accuracy. In other words, the light receiving elements arranged at the position including the shadow area of the diffractive lens structure are used for subtraction, and thus the signal amplitude near the reference mark 22 can be increased. This realizes the reference position detection through which a position is less likely to be erroneously detected. If the reference position is detected with high accuracy, a position of the scale (an object) can be calculated with high accuracy in combination with a relative position calculated by the equation (5) using the scale track 21a.

Figure 10:
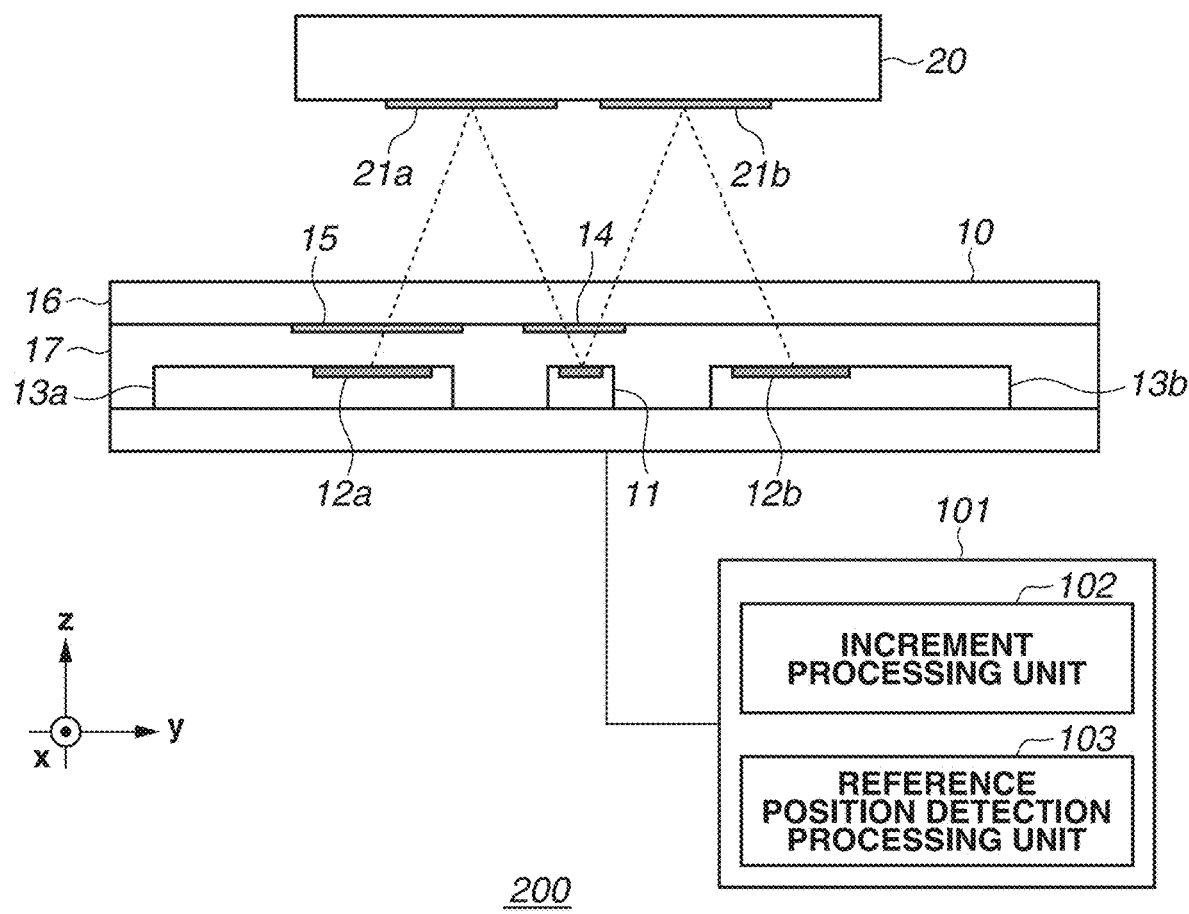
FIG. 10 is a schematic configuration diagram of a position detection apparatus according to a second exemplary embodiment.

A second exemplary embodiment of the present invention will be described below. FIG. 10 is a configuration diagram illustrating a position detection apparatus 200 according to the second exemplary embodiment. The second exemplary embodiment is different from the first exemplary embodiment in that light from the light source 11 in the sensor unit 10 passes through the light source grating 14 and then illuminates the scale track 21b.

Figure 11:
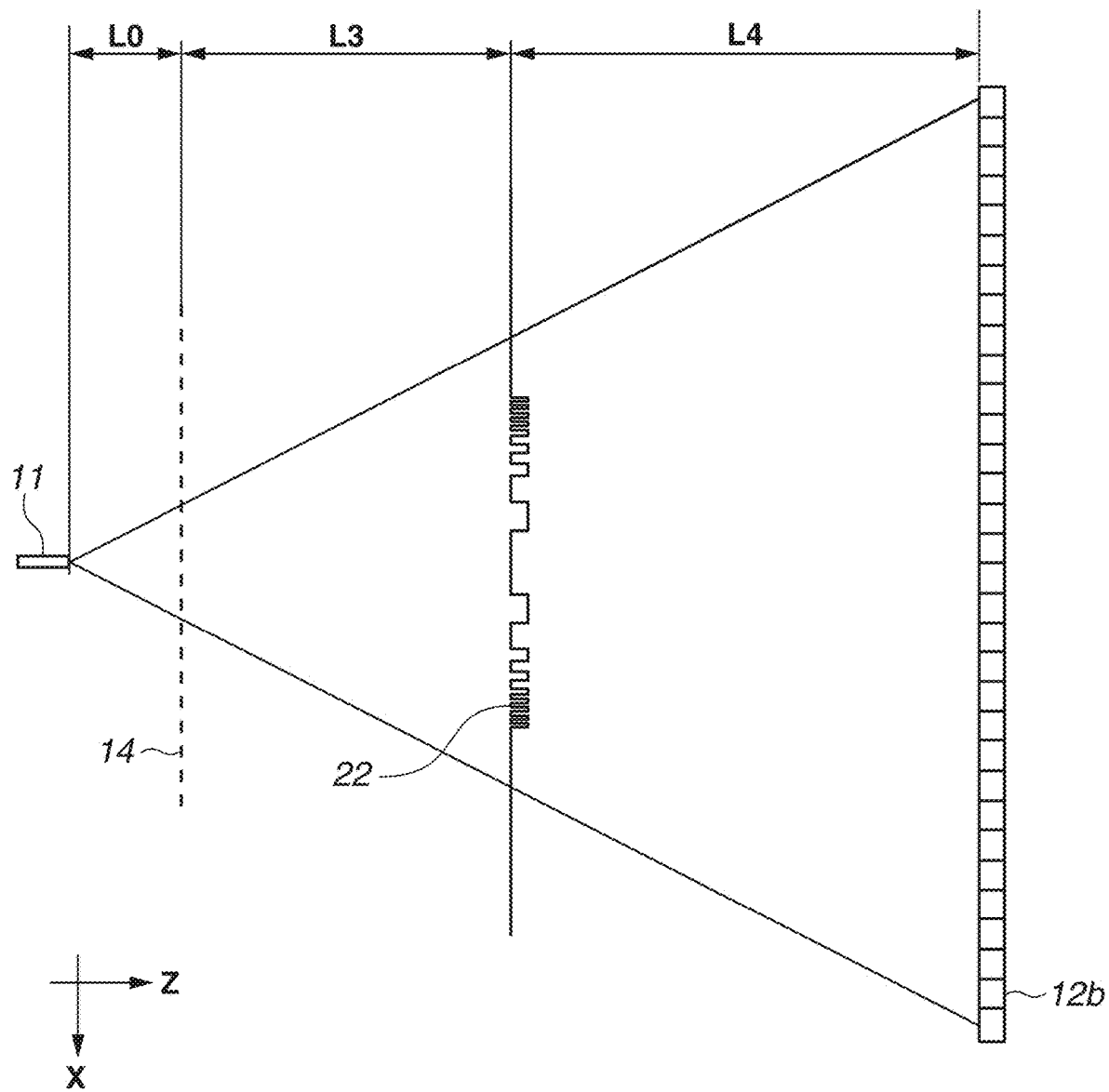
FIG. 11 is a development view of an optical path according to the second exemplary embodiment.

An optical path in the position detection apparatus 200 will be described with reference to FIG. 11. FIG. 11 is a development view of the optical path in the position detection apparatus 200 in which reflection is developed as if it is transmitted. A distance L0 serving as an effective optical path length from the light source 11 to the light source grating 14 is 0.3 mm A distance L3 serving as an effective optical path length from the light source grating 14 to the reference mark 22 is set in a range of 0.7 mm±0.3 mm A distance L4 serving as an effective optical path length from the reference mark 22 to the light receiving element array 12b is set so that L4=L0+L2.

In the reference mark 22, the n-th boundary position counted from the center of the reference mark 22 is formed at the position Xn represented by the equation (1). The focal length f of the diffractive lens in the present exemplary embodiment is 0.7 mm. In other words, the divergent luminous flux from the light source 11 converges to a position farther than the surface of the light receiving element array. In this way, an effect of forming a periodic image of the light source grating 14 on the light receiving surface and preventing the signal from becoming unstable can be obtained.

Figure 12:
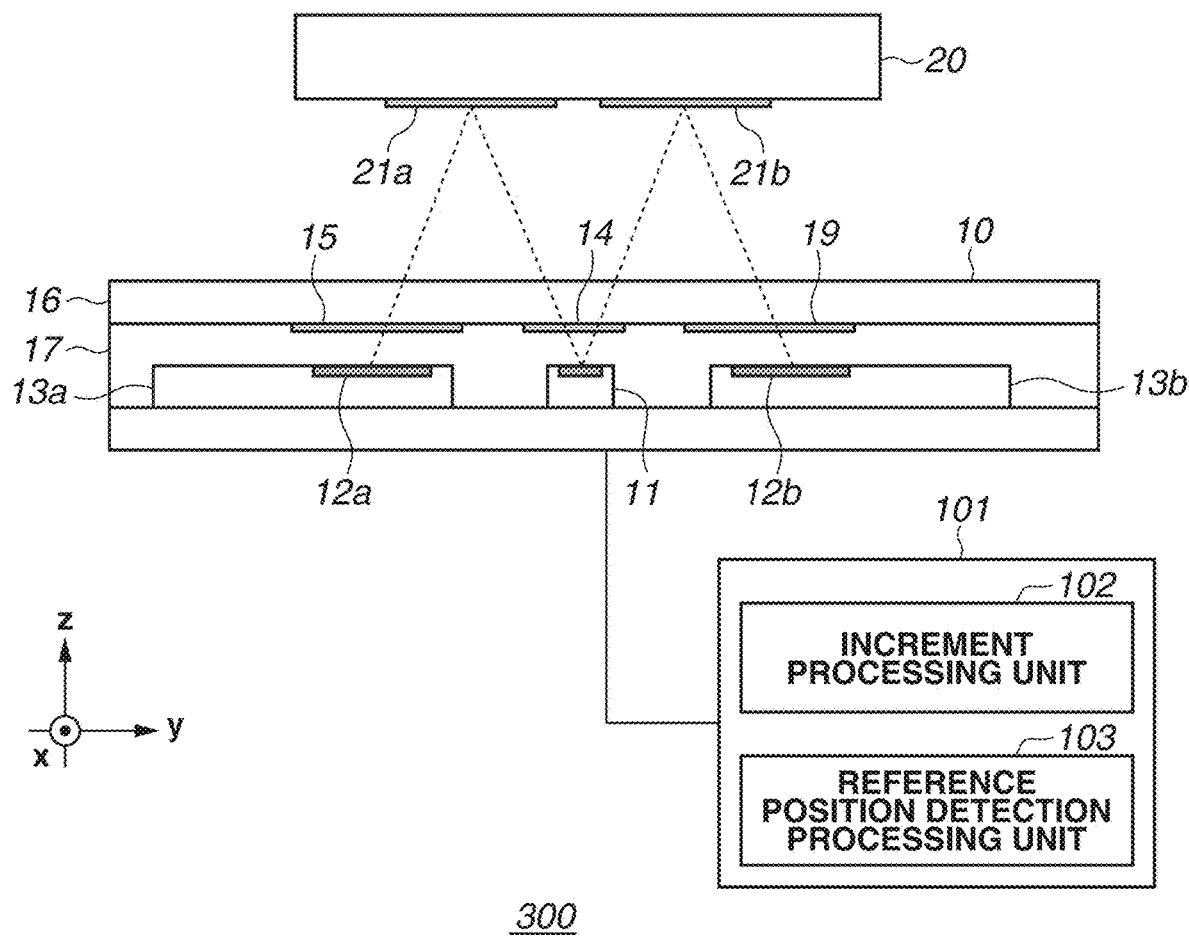
FIG. 12 is a schematic configuration diagram of a position detection apparatus according to a third exemplary embodiment.

A third exemplary embodiment of the present invention will be described below. FIG. 12 is a configuration diagram illustrating a position detection apparatus 300 according to the third exemplary embodiment. The third exemplary embodiment is different from the second exemplary embodiment in that an origin detection grating 19 is provided along an optical path from the scale track 21b to the light receiving element array 12b and also in the configurations of the scale track 21b and the light receiving IC. The origin detection grating 19 is a transmission diffraction grating including transmission portions and light-shielding portions alternately arranged in the direction perpendicular to the X direction.

Figure 13:
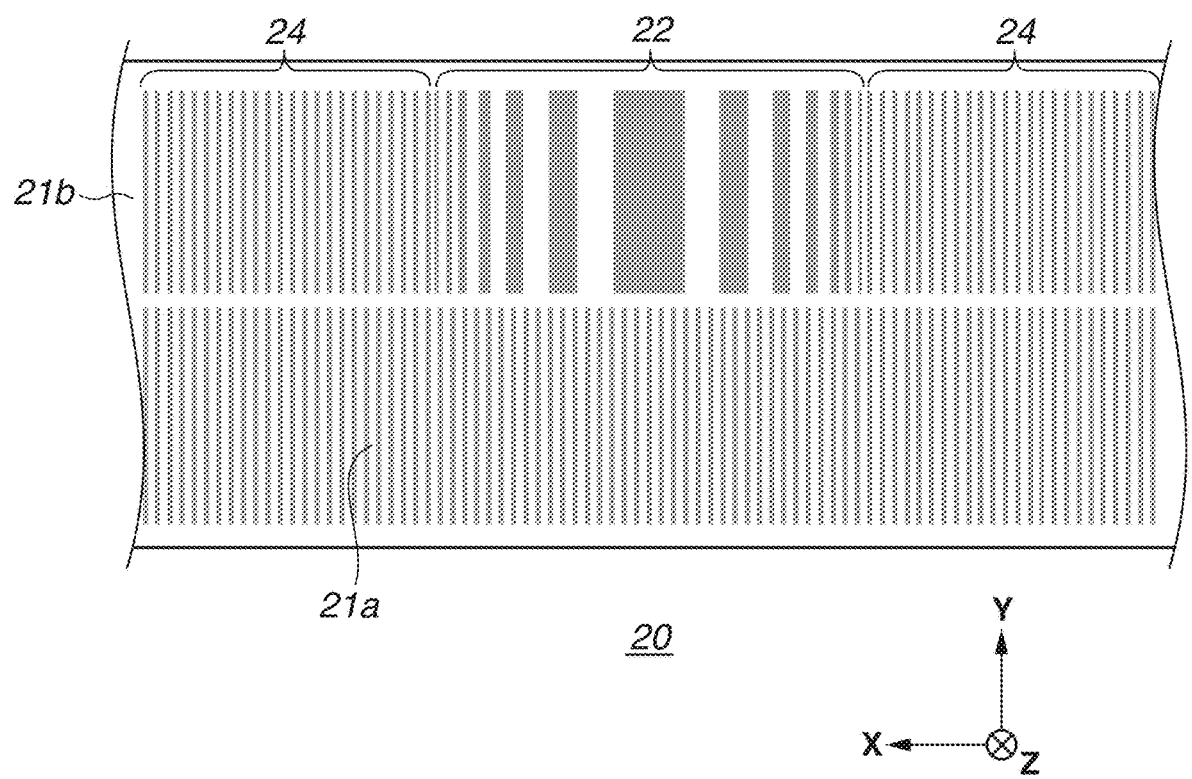
FIG. 13 is a plan view of a scale according to the third exemplary embodiment.

Next, the configurations of the scale tracks 21a and 21b in the scale 20 in the present exemplary embodiment will be described with reference to FIG. 13. FIG. 13 is a partially enlarged plan view of the scale 20 (the scale tracks 21a and 21b). In FIG. 13, portions painted with dots represent depressions in a step pattern. The scale track 21a includes a pattern row in which the step pattern having a width of 2 μm is arranged at each period, namely each pitch (=4 μm) in the movement direction (the X direction).

In the scale track 21b arranged in parallel with the scale track 21a, the reference mark 22 (the reference grating) is formed in which depressions are arranged at unequal intervals in the movement direction (the X direction) at the specific position (the reference position) on the scale 20. A grating interval is reduced as the distance from the center of the reference mark 22 increases, and the reference mark 22 has the diffractive lens structure in which the divergent luminous flux from the light source 11 linearly converges at the predetermined distance by diffraction. In an area other than the reference mark 22 in the scale track 21b, a grating area 24 (a second diffraction grating) is formed which includes a pattern row in which the step pattern having a width of 2.45 μm is arranged at each period, namely each pitch (=4.9 μm) in the movement direction (the X direction). A grating period in the grating area 24 is set so that positive first-order diffracted light and negative first-order diffracted light from the same point enter separately to positions of approximately opposite phase (256 μm). Thus, influences of dust adhering on the scale and a pattern defect can be canceled by the following calculation, and erroneous detection is less likely to occur.

Figure 14:
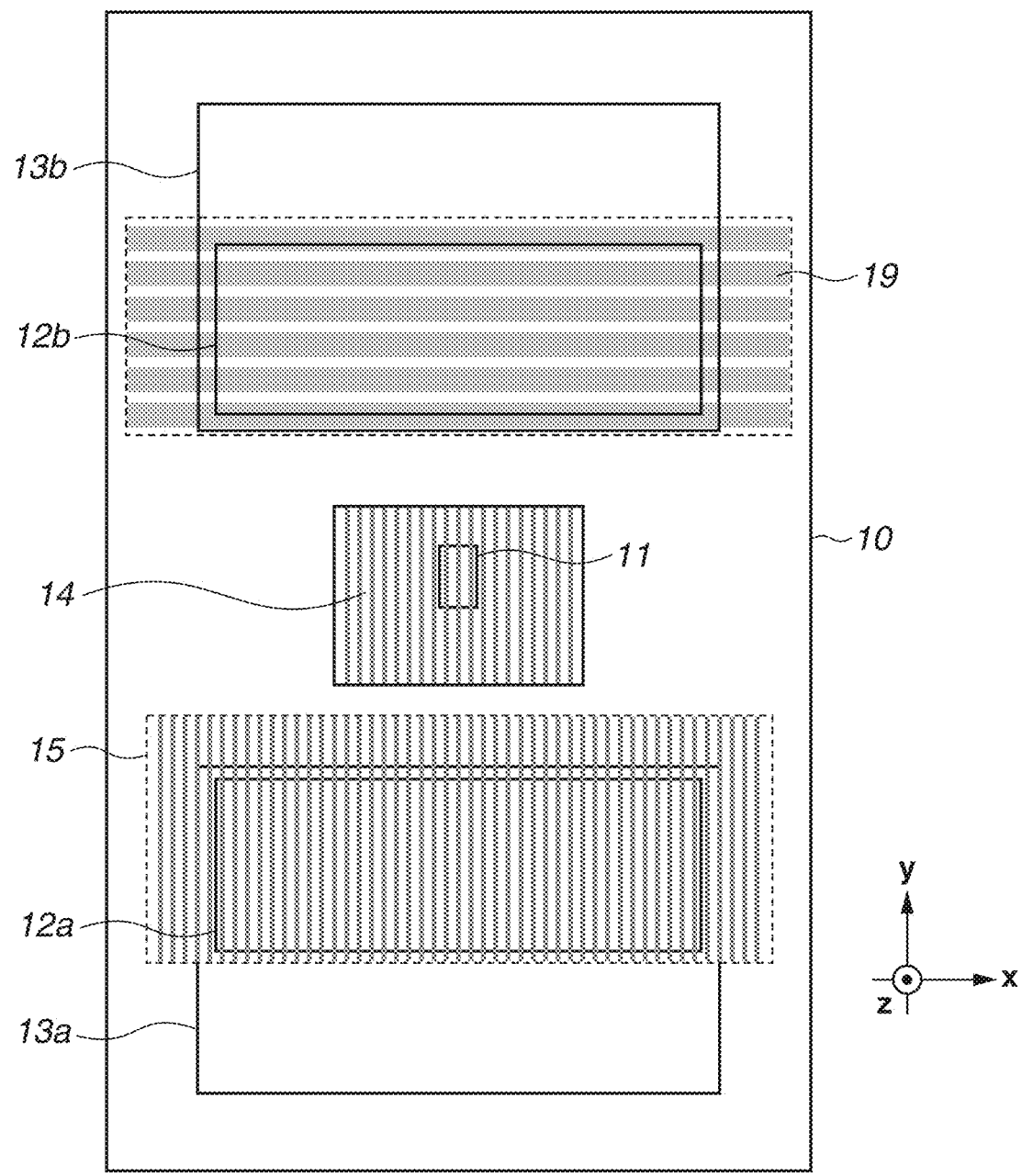
FIG. 14 is a plan view of a sensor unit according to the third exemplary embodiment.

Next, the configuration of the sensor unit 10 will be described with reference to FIG. 14. FIG. 14 is a plan view of the sensor unit 10 viewed from the side of the scale 20.

The grating pattern of the light source grating 14 has the pitch (the pattern period) of 4 μm. The increment detection grating 15 includes a grating pattern having a predetermined pitch (=4.069952 μm) in the X direction. In the origin detection grating 19, the light-shielding portions having a width of 18 μm and opening portions having a width of 2 μm are alternately arranged in the direction perpendicular to the X direction (the Y direction). With this grating configuration, a light amount received by the light receiving element array 12b can be attenuated, and a light amount ratio with respect to the increment signal can be adjusted. A grating period direction is set to a direction perpendicular to a position detection direction, and thus a light amount profile in the movement direction can be prevented from being affected.

The distance L0 serving as the effective optical path length from the light source 11 to the light source grating 14 is 0.3 mm. The distance L3 serving as the effective optical path length from the light source grating 14 to the reference mark 22 is set in a range of 1.6 mm±0.3 mm. The distance L4 serving as the effective optical path length from the reference mark 22 to the light receiving element array 12b is set so that L4=L0+L3.

Next, the arrangement of the light receiving element array 12a in the light receiving IC 13a in the present exemplary embodiment will be described with reference to FIG. 15. FIG. 15 is a plan view of the light receiving element array 12a in the present exemplary embodiment, and illustrates the arrangement of the light receiving element array 12a on the light receiving surface. In the light receiving element array 12a, a plurality of (64 pieces of) light receiving elements is arranged in a row along the X direction. Every light receiving element has the width $X_{pd}$ of 32 μm in the X direction and the width $Y_{pd}$ of 450 μm in the Y direction. The light receiving element array 12a has the entire width Wpd of 2048 μm in the X direction.

The 64 light receiving elements are assigned in a circulating manner in the order of the A+ phase, the B+ phase, the A− phase, and the B− phase with some parts skipped, and the 12 light receiving elements assigned to respective one of the four phases form a light receiving element group. The period $P_{pd}$ (the circulation period) of the light receiving elements in the same phase is 256 μm, which corresponds to the width of eight light receiving elements and corresponds to the detection period of the light intensity distribution on the light receiving element surface. The 12 light receiving elements forming each light receiving element group are electrically connected to each other, and outputs (currents) of the light receiving elements are added to each other and input to the IV conversion amplifier (not illustrated) provided for each phase in the subsequent stage. The four IV conversion amplifiers each output the corresponding one of the four phase signals, S1(A+), S1(B+), S1(A−), and S1(B−).

The signals S1(A+), S1(B+), S1(A−), and S1(B−) are voltage signals (sinusoidal signals) of which values change in a sinusoidal manner in accordance with the movement of the scale 20. The respective output signals from the four IV conversion amplifiers provided for the four phases correspond to a different one of the signal phases of 0 degrees, 90 degrees, 180 degrees, and 270 degrees. Further, the four phase signals S1(A+), S1(B+), S1(A−), and S1(B−) are subjected to the calculations represented by the equations (3) and (4) and converted into the two phase sinusoidal signals S1(A) and S1(B) in which a DC component is removed from the four phase signals.

The two phase sinusoidal signals S1(A) and S1(B) output from the sensor unit 10 are transmitted to the signal processing circuit 101. The increment processing unit 102 in the signal processing circuit 101 obtains the phase signal Φ1 which becomes the source of the position signal by performing the calculation represented by the equation (5). Further, the increment processing unit 102 generates the position information by accumulating amounts of change in the phase signal Φ1.

FIG. 16 illustrates the arrangement of the light receiving element array 12b in the light receiving IC 13b. In the light receiving element array 12b, a plurality of (64 pieces of) light receiving elements is arranged in a row along the X direction. One light receiving element has the width $X_{pd}$ of 32 μm in the X direction and the width $Y_{pd}$ of 450 μm in the Y direction. The light receiving element array 12b has the entire width Wpd of 2048 μm in the X direction.

The 64 light receiving elements are assigned in a circulating manner in the order of the A+ phase, the B+ phase, the A− phase, and the B− phase with some parts skipped, and the 12 light receiving elements assigned to respective one of the four phases form a light receiving element group. The light receiving elements assigned to the A+ phase include eight light receiving elements on a center portion and four light receiving elements on a left side of the peripheral portion, which form one group. The light receiving elements assigned to the B+ phase include eight light receiving elements on the center portion and four light receiving elements on a right side of the peripheral portion, which form one group. The light receiving elements assigned to the A− phase include eight light receiving elements on the center portion and four light receiving elements on the right side of the peripheral portion, which form one group. The light receiving elements assigned to the B− phase include eight light receiving elements on the center portion and four light receiving elements on the left side of the peripheral portion and form one group. The light receiving element assigned to the A+ phase and the light receiving element assigned to the B+ phase are adjacent to each other in the center portion. A light receiving element assigned to the A+ phase and a light receiving element assigned to the B+ phase are arranged between a light receiving element assigned to the A− phase and a light receiving element assigned to the B− phase. The period $P_{pd}$ (the circulation period) is 1024 μm which corresponds to a width of 32 light receiving elements.

The light receiving element array 12b includes four groups of the eight light receiving elements in the center portion and a plurality of light receiving elements 91 of which an output is added to that of the light receiving elements arranged on both sides of the center portion. The 12 light receiving elements forming each light receiving element group are electrically connected to each other, and outputs (currents) of the light receiving elements are added to each other and input to the IV conversion amplifier (not illustrated) provided for each phase in the subsequent stage. The four IV conversion amplifiers each output the corresponding one of the four phase signals S2(A+), S2(B+), S2(A−), and S2(B−). The light receiving element array 12b of which the output is added to that of the light receiving element (the first light receiving element) assigned to the A+ phase in the center portion includes the light receiving elements assigned to the A+ phase (fifth light receiving elements) in the peripheral portion. The light receiving elements assigned to the A+ phase in the peripheral portion are arranged at a position of which a distance from an adjacent portion (the center) where a light receiving element assigned to the A+ phase is adjacent to a light receiving element assigned to the B+ phase in the center portion is greater than the distance from the light receiving elements (the third light receiving elements) assigned to the A− phase in the center portion.

Further, the four phase signals S2(A+), S2(B+), S2(A−), and S2(B−) are subjected to the calculations represented by the equations (6) and (7) and converted to the two phase signals S2(A) and S2(B). The two phase signals S2(A) and S2(B) output from the light receiving IC 13b are transmitted to the reference position detection processing unit 103 in the signal processing circuit 101.

The distance D from the center of the shadow resulting from the diffraction of the reference mark 22 can be calculated by the following equation (14).

$$D=(Z1+Z2)/Z1\times(w/2+Z2\times\tan(\arcsin(\lambda/d))) \quad (14)$$

In the equation (14), Z1 is a distance from the light source 11 to the scale 20 (L0+L3 in the present exemplary embodiment), and Z2 is a distance from the scale 20 to the surface of the light receiving element array 12b (L4 in the present exemplary embodiment). Further, λ is a wavelength of the light source 11, d is a grating interval of the grating area 24, and w is a width of the reference mark 22.

According to the present exemplary embodiment, at least some of the light receiving elements ("A−" and "B−" in FIG. 16) used for subtraction are arranged inside a range of the distance D. In other words, a light receiving element assigned to the A− phase and a light receiving element assigned to the B− phase are arranged at positions at which the distance X from the center of the light receiving element array satisfies X<(Z1+Z2)/Z1×(w/2+Z2×tan(arcsin(λ/d))). Thus, the light receiving elements arranged at the position including the shadow area of the diffractive lens structure is used for subtraction, and thus the signal amplitude near the reference mark 22 can be increased. This realizes the reference position detection through which erroneous detection is less likely to occur.

Figure 17A:
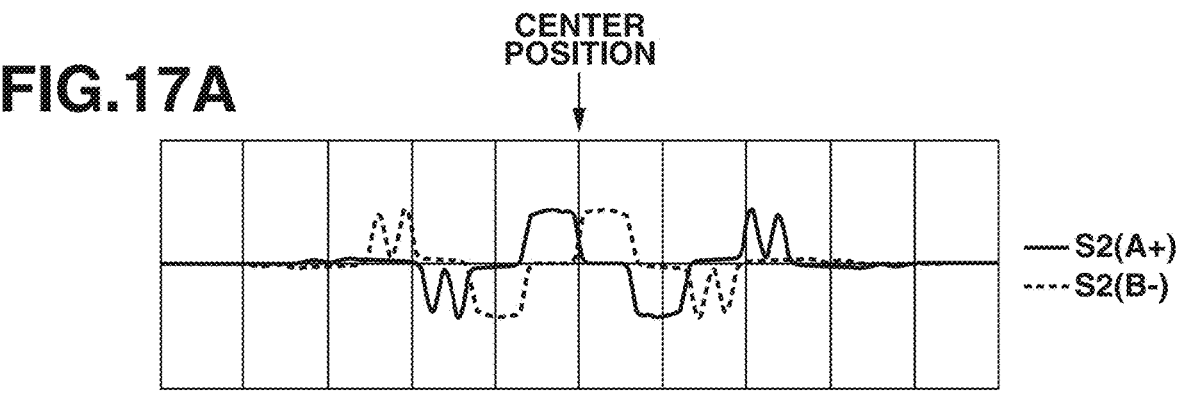
FIGS. 17A to 17D are each a diagram of signal waveforms near a reference mark according to the third exemplary embodiment.
Figure 17B:
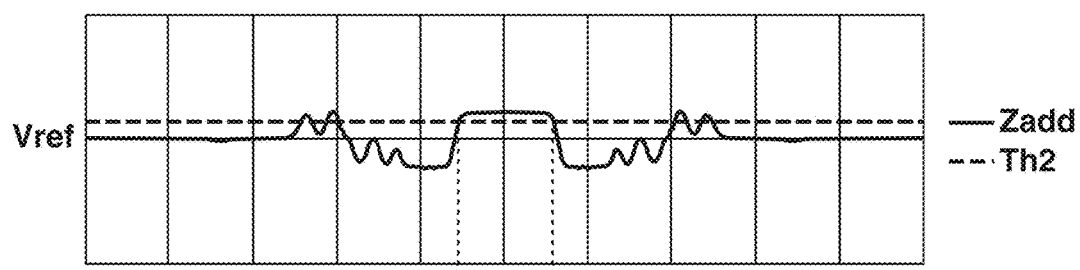
Figure 17C:
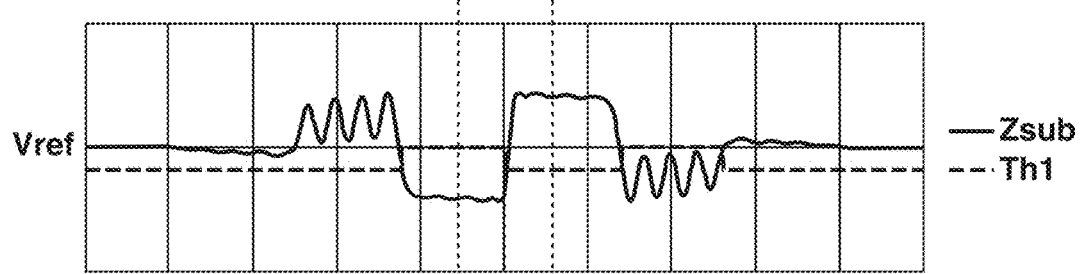
Figure 17D:
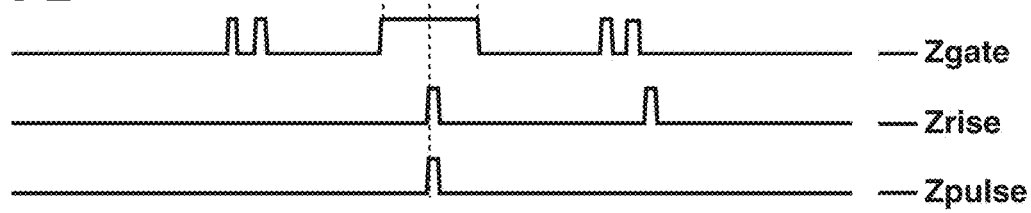

Next, each signal waveform near the reference mark 22 will be described with reference to FIGS. 17A to 17D. FIGS. 17A to 17D are each a diagram of signal waveforms near the reference mark 22 in a case where the light from the reference mark 22 is detected by the light receiving element array 12b. FIG. 17A illustrates waveforms of the two phase signals S2(A) and S2(B) near the reference mark 22. FIG. 17B illustrates waveforms of the addition signal Zadd and the threshold value Th2 near the reference mark 22. FIG. 17C illustrates waveforms of the differential signal Zsub and the threshold value Th1 near the reference mark 22. FIG. 17D illustrates waveforms of the gate signal Zgate, the rising edge signal Zrise, and the origin signal Zpulse (the origin pulse) near the reference mark 22. It can be seen that the waveform of the origin signal Zpulse (the origin pulse) indicates the center position of the reference mark 22. According to the present exemplary embodiment, the reference position can be detected with high accuracy even in a case where the reference mark has the diffractive lens structure.

Figure 18:
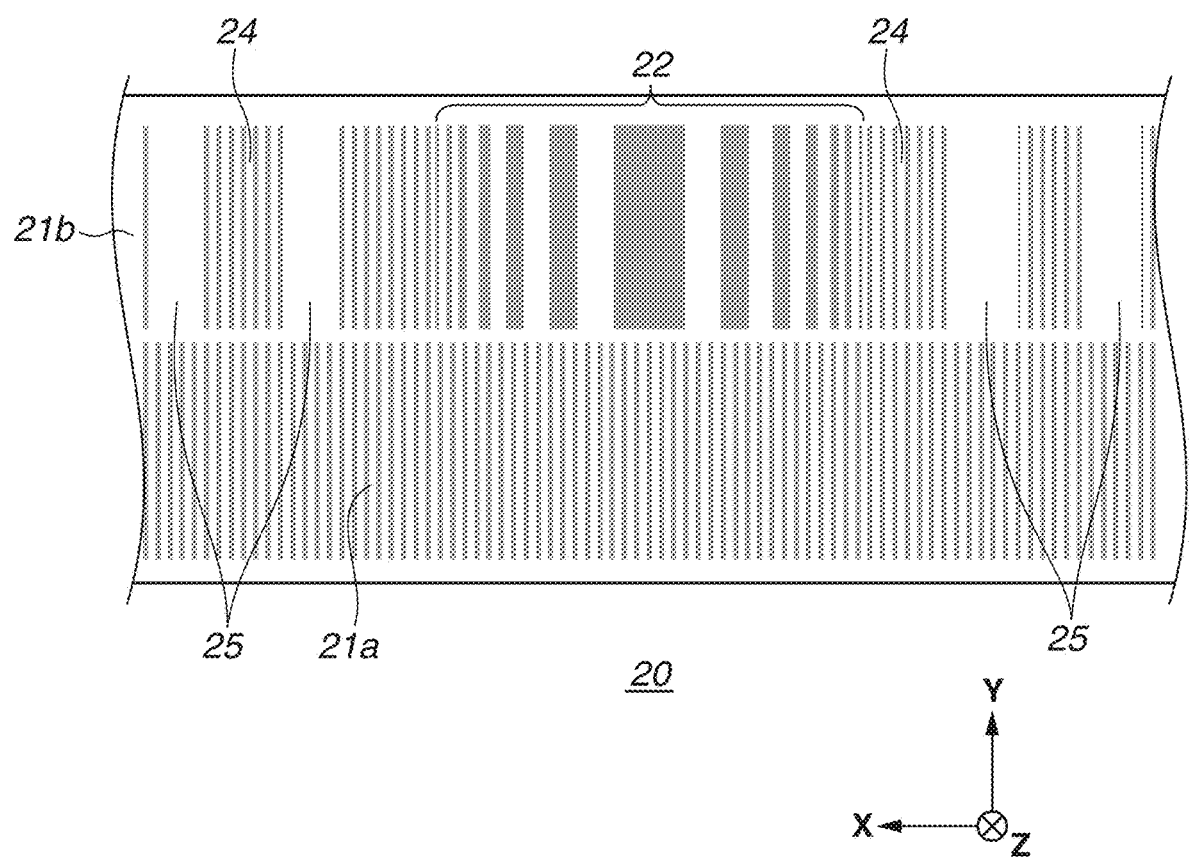
FIG. 18 is a plan view of a scale according to a fourth exemplary embodiment.

A fourth exemplary embodiment of the present invention will be described below. Configurations of scale tracks 21a and 21b in a scale 20 according to the fourth exemplary embodiment will be described with reference to FIG. 18. FIG. 18 is a partially enlarged plan view of the scale 20 (the scale tracks 21a and 21b). In FIG. 18, portions painted with dots represent depressions in a step pattern. The scale track 21a includes a pattern row in which the step pattern having a width of 2 μm is arranged at each period of 4 μm in the movement direction (the X direction). In the scale track 21b arranged in parallel with the scale track 21a, a reference mark 22 (a reference grating) is formed in which depressions are arranged at unequal intervals in the X direction at a specific position (a reference position) on the scale 20. A grating interval is reduced as a distance from the center of the reference mark 22 increases, and the reference mark 22 has a diffractive lens structure in which a divergent luminous flux from a light source 11 linearly converges at a predetermined distance by diffraction. In an area other than the reference mark 22 in the scale track 21b, a grating area 24 (a second diffraction grating) is formed which includes a pattern row in which the step pattern having a width of 2.45 μm is arranged at each period of 4.9 μm in the X direction. A plurality of the grating areas 24 including the pattern rows is arranged at intervals. There are areas 25 (reflection portions) without gratings in a range from 384 to 512 μm inclusive and a range from 640 to 768 μm inclusive on the both sides of the center of the reference mark 22.

The arrangement of the light receiving element array 12b is the same as that of the third exemplary embodiment. Reflected light from the range from 384 to 512 μm inclusive from the center of the reference mark 22 enters a positive side of a plurality of light receiving elements 91 ("A+" and "B+" of the light receiving elements 91 in FIG. 16). This arrangement prevents the addition signal Zadd at an origin position from being increased, thus preventing erroneous detection.

Figure 19A:
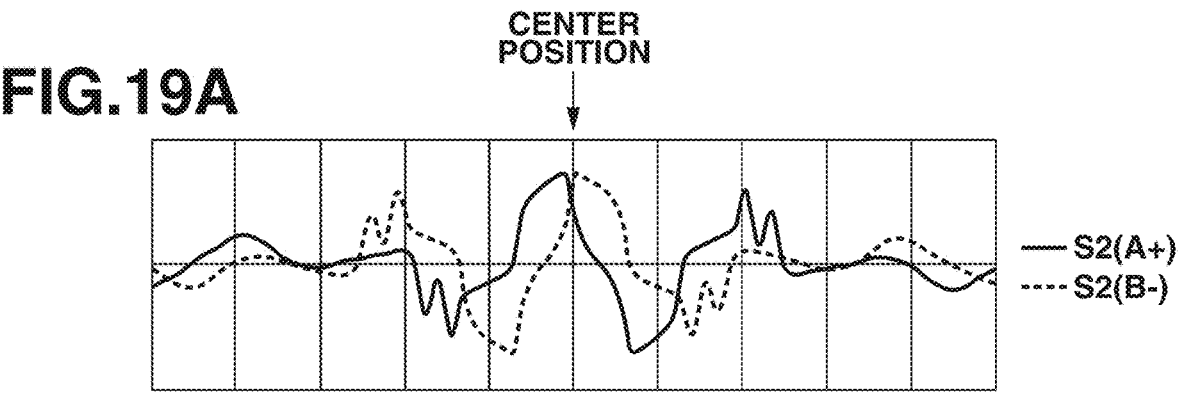
FIGS. 19A to 19D are each a diagram of signal waveforms near a reference mark according to the fourth exemplary embodiment.
Figure 19B:
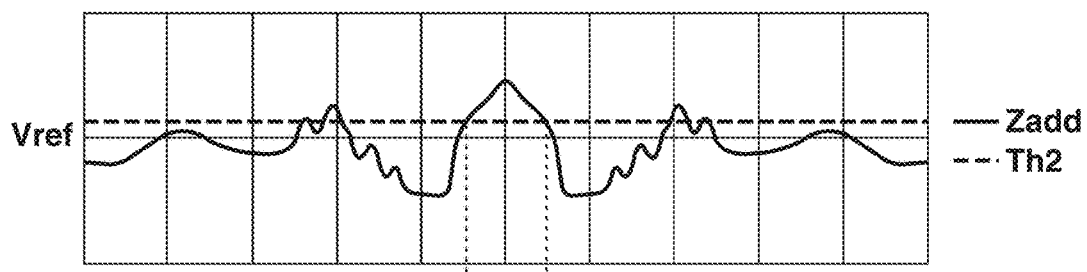
Figure 19C:
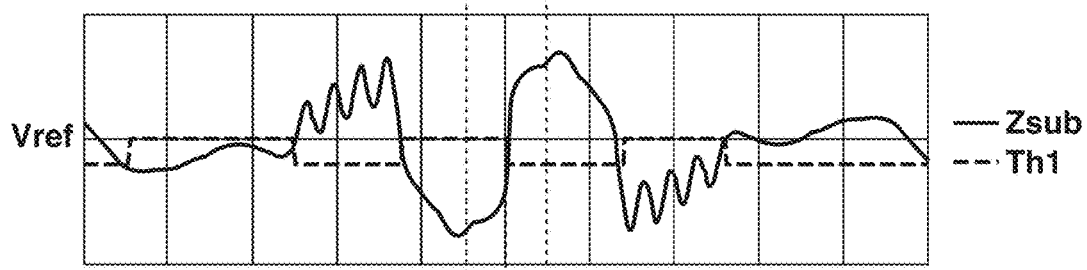
Figure 19D:
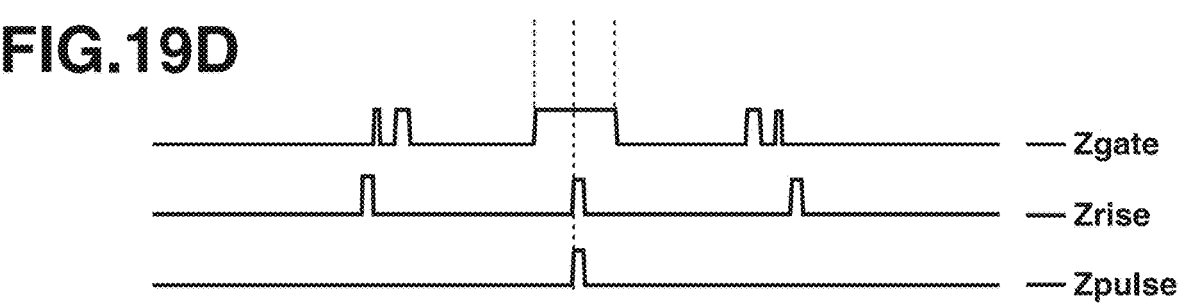

Next, each signal waveform near the reference mark 22 will be described with reference to FIGS. 19A to 19D. FIGS. 19A to 19D are signal waveform diagrams near the reference mark 22. FIG. 19A illustrates waveforms of the two phase signals S2(A) and S2(B) near the reference mark 22. FIG. 19B illustrates waveforms of the addition signal Zadd and the threshold value Th2 near the reference mark 22. FIG. 19C illustrates waveforms of the differential signal Zsub and the threshold value Th1 near the reference mark 22. FIG. 19D illustrates waveforms of the gate signal Zgate, the rising edge signal Zrise, and the origin signal Zpulse (then origin pulse) near the reference mark 22. It can be seen that the waveform of the origin signal Zpulse (the origin pulse) indicates the center position of the reference mark 22. According to the present exemplary embodiment, the reference position can be detected with high accuracy even in a case where the reference mark has the diffractive lens structure.

In the above-described exemplary embodiments, a reflection type position detection apparatus has been described which reflects light from the light source by a reflection type scale (a scale grating) and receives the light by the light receiving element array. However, the configuration is not limited to the above-described one. Each exemplary embodiment can be applied to, for example, a transmission position detection apparatus which transmits light from the light source through a transmission scale and receives the light by the light receiving element array. In each exemplary embodiment, the position detection apparatus (a linear encoder) using a linear scale has been described. However, the configuration is not limited thereto. Each exemplary embodiment can be applied to, for example, a rotary encoder using a rotary scale. In the case of the rotary encoder, a scale pattern may be configured radially. According to the above-described exemplary embodiments, a pattern of the scale 20 is a phase pattern using a step. However, the configuration is not limited thereto. A similar effect can be obtained with the same design using reflective and non-reflective patterns instead of projections and depressions.

Figure 20:
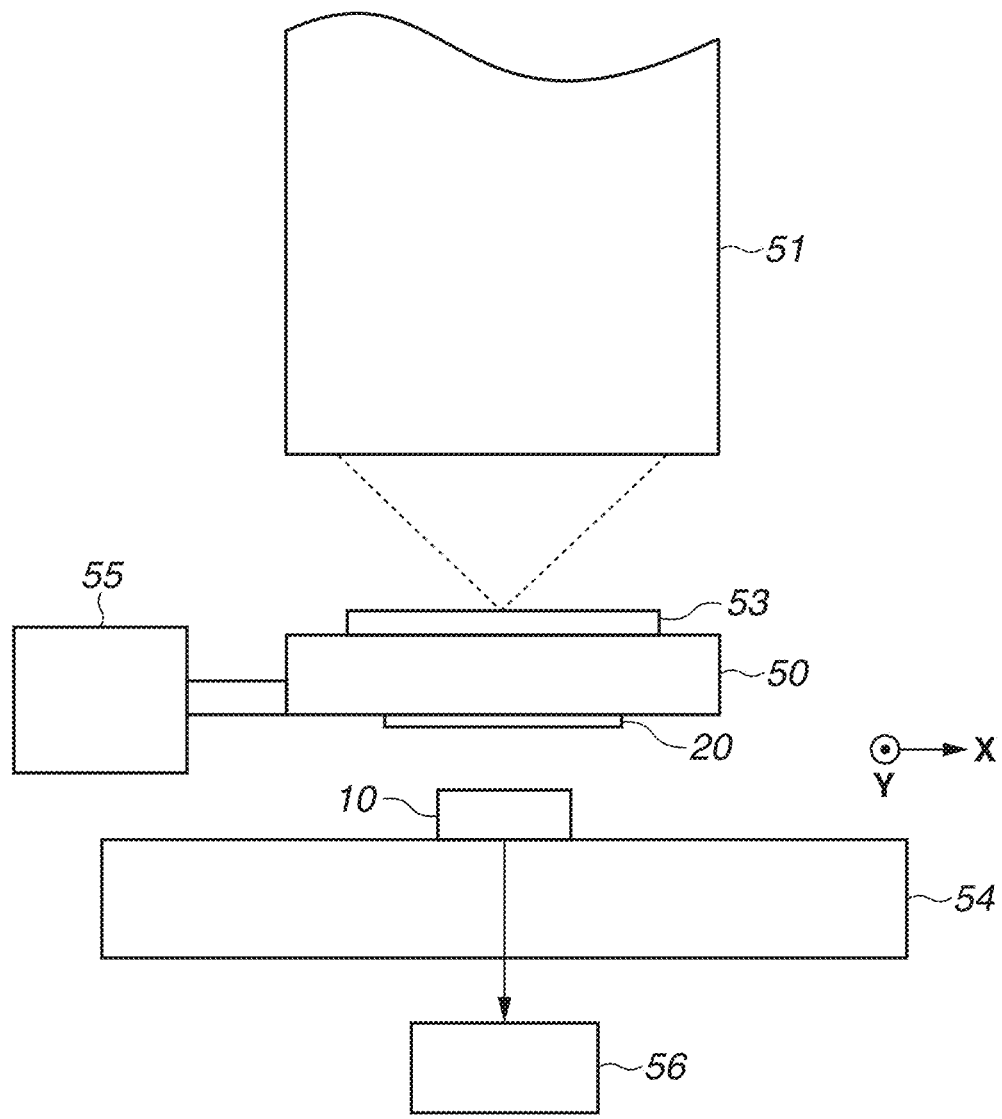
FIG. 20 is a configuration diagram illustrating an exposure apparatus according to a fifth exemplary embodiment.

A fifth exemplary embodiment of the present invention will be described below. An exposure apparatus according to a fifth exemplary embodiment will be described with reference to FIG. 20. FIG. 20 is a schematic configuration diagram of an exposure apparatus 400 according to the present exemplary embodiment. The exposure apparatus 400 is configured to form an electronic circuit on a semiconductor wafer by exposure and is provided with, for example, the position detection apparatus 100 described in the first exemplary embodiment. The exposure apparatus 400 uses the position detection apparatus 100 to detect a position of a stage on which a semiconductor wafer is mountable and which is drivable in a two-dimensional direction.

In FIG. 20, the exposure apparatus 400 includes a stage 50 serving as a movable portion which can be operated and a projection optical system 51 which projects (exposes) an electronic circuit image as an optical image of a mask not illustrated on a wafer 53. The wafer 53 is mounted on the stage 50. The stage 50 is driven by a drive mechanism 55 in the X direction and the Y direction with respect to the projection optical system 51. With this arrangement, a projection position of the electronic circuit image is controlled on the wafer 53.

The exposure apparatus 400 includes the position detection apparatus 100. The scale 20 of the position detection apparatus 100 is attached to the stage 50 (the movable portion). The sensor unit 10 in the position detection apparatus 100 is attached to a housing 54, which is a fixed portion of the exposure apparatus 400. In the present exemplary embodiment, a relationship between the fixed portion and the movable portion may be reversed, so that the sensor unit 10 can be attached to the movable portion, and the scale 20 can be attached to the fixed portion. In other words, the sensor unit 10 and the scale 20 may be relatively movable. In the present exemplary embodiment, the position detection apparatus according to the second to the fourth exemplary embodiments may be used instead of the position detection apparatus 100 (the sensor unit 10).

The exposure apparatus 400 includes a control unit 56 which calculates the position of the stage 50 based on a result of the detection made by the position detection apparatus 100, in other words, output signals from the light receiving element arrays 12a and 12b in the sensor unit 10 and controls the drive mechanism 55.

The reference position is detected with high accuracy by the position detection apparatus, so that the position of the stage 50 in the exposure apparatus 400 can be stably detected with high resolution, and a movement (an operation) of the stage 50 can be controlled with high accuracy.

Figure 21:
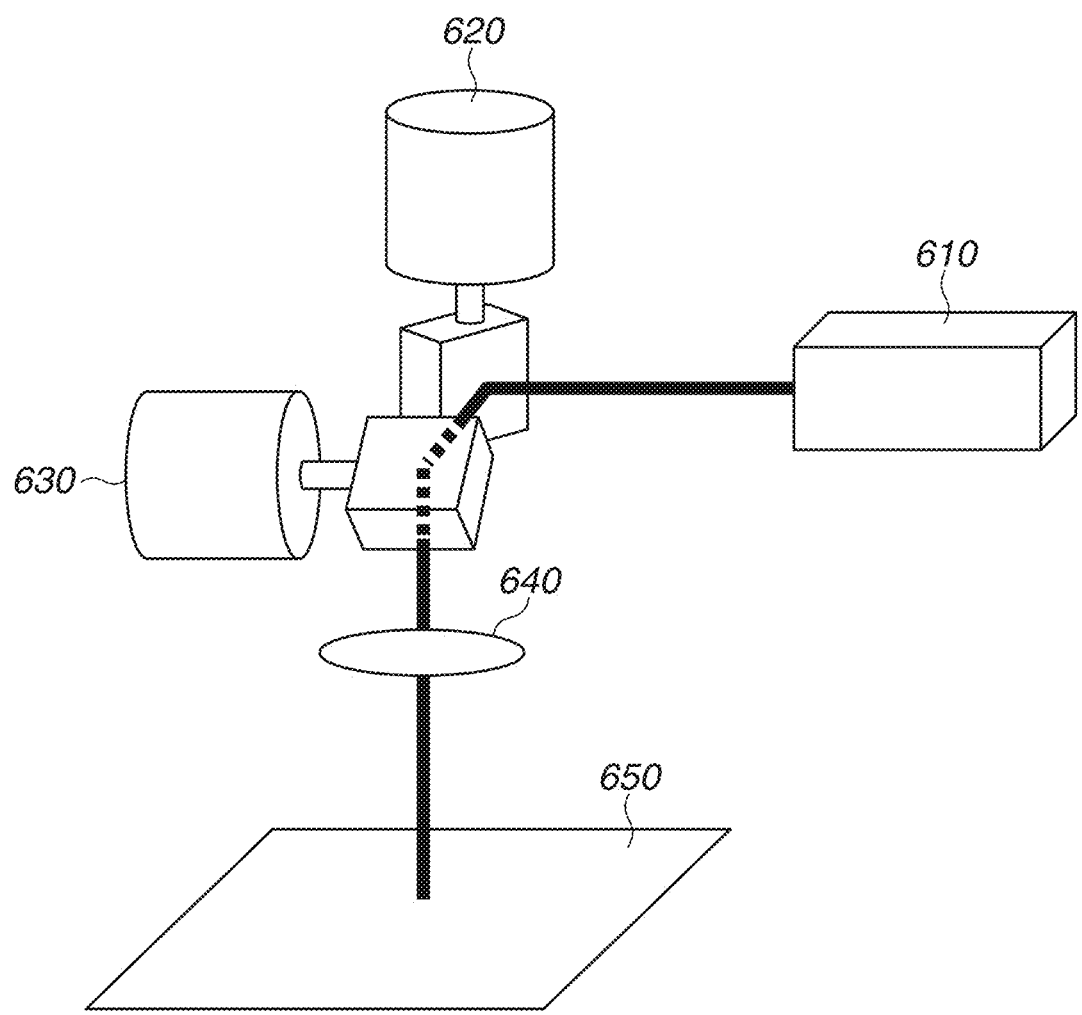
FIG. 21 illustrates a configuration of a laser processing apparatus according to a sixth exemplary embodiment.

A sixth exemplary embodiment of the present invention will be described. FIG. 21 illustrates an example of a laser processing apparatus including a galvano scanning apparatus (a galvano scanner). The laser processing apparatus includes a laser light source 610, galvano scanning apparatuses 620 and 630, and a lens 640. A laser beam from the laser light source 610 is deflected in orthogonal biaxial directions by the galvano scanning apparatuses 620 and 630. The laser light focused by the lens 640 is applied to a processing target object 650.

The galvano scanning apparatuses 620 and 630 include mirrors in rotation movable portions and are driven by motors. The galvano scanning apparatuses 620 and 630 include the above-described optical encoders (rotary encoders) attached to rotating shafts of the motor and the mirror. An output of the optical encoder is input to a control unit (not illustrated) including a built-in arithmetic apparatus, such as a central processing unit (CPU), and the control unit controls a rotation angle of the motor. A position (the rotation angle) can be detected with high accuracy using the foregoing encoder, and the rotation angle of the motor can be controlled with high accuracy.

The movable portion in a drive control apparatus is not limited to the stage and the mirror as in the fifth or the sixth exemplary embodiment, and the present invention can be applied to a movable portion which can be driven and displaced. In other words, the present invention can be applied to general drive control apparatuses that measure a displacement amount of the movable portion using the above-described optical encoder and control a movement of the movable portion based on the measured displacement amount. For example, a machining apparatus is configured to include a machine device including a robot arm or a conveyance body for conveying an assembling target and the encoder in each exemplary embodiment for detecting a position or an orientation of the machine device, and thus a position of the conveyance body can be detected with high accuracy.

According to the present invention, an optical encoder which detects a reference position with high accuracy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-099491, filed Jun. 8, 2020, which is hereby incorporated by reference herein in its entirety.

What is claimed is:

1. An optical encoder comprising:
a light source;
a scale;
a light receiving unit configured to receive light from the scale; and
a processing unit configured to process a signal from the light receiving unit,
wherein the scale includes a diffraction grating configured to condense diffracted light in a periodic direction of the diffraction grating in order to detect a reference position,
wherein the light receiving unit includes a light receiving element array configured to receive light from the diffraction grating,
wherein the light receiving element array includes a first light receiving element, a second light receiving element, a third light receiving element, and a fourth light receiving element configured to output signals having phases different from each other,
wherein the first light receiving element and the second light receiving element are adjacent to each other and are arranged between the third light receiving element and the fourth light receiving element,
wherein the processing unit obtains a first differential signal between a signal from the first light receiving element and a signal from the third light receiving element and obtains a second differential signal between a signal from the second light receiving element and a signal from the fourth light receiving element, and
wherein the processing unit adds the first differential signal and the second differential signal and subtracts the first differential signal and the second differential signal to output a reference voltage as a reference.

2. The optical encoder according to claim 1, wherein the diffraction grating includes a first diffraction grating of which a grating period is reduced as a distance from a center increases.

3. The optical encoder according to claim 2, wherein the diffraction grating includes a reflection portion formed in a vicinity of the first diffraction grating.

4. The optical encoder according to claim 3, wherein no diffraction grating is formed in the reflection portion.

5. The optical encoder according to claim 2, wherein the diffraction grating includes a second diffraction grating that is different from the first diffraction grating and is formed in a vicinity of the first diffraction grating.

6. The optical encoder according to claim 5, wherein the light receiving element array includes a fifth light receiving element of which an output is added to an output of the first light receiving element, and the fifth light receiving element is arranged at a position at which a distance from a portion where the first light receiving element adjacent to the second light receiving element is greater than that from the third light receiving element.

7. The optical encoder according to claim 5, wherein a plurality of the second diffraction gratings is formed at predetermined intervals in the vicinity of the first diffraction grating in the diffraction grating.

8. The optical encoder according to claim 1, wherein the third light receiving element and the fourth light receiving element are arranged at positions at which a distance X from a center of the light receiving element array satisfies the following conditional expression:

$$X<(Z1+Z2)/Z1\times(w/2),$$

where $Z1$ is a distance from the light source to the scale, $Z2$ is a distance from the scale to a surface of the light receiving element array, and $w$ is a width of the first diffraction grating.

9. The optical encoder according to claim 5, wherein the third light receiving element and the fourth light receiving element are arranged at positions where a distance X from a center of the light receiving element array satisfies the following conditional expression:

$$X<(Z1+Z2)/Z1\times(w/2+Z2\times\tan(\arcsin(\lambda/d))),$$

where $Z1$ is a distance from the light source to the scale, $Z2$ is a distance from the scale to a surface of the light receiving element array, $\lambda$ is a wavelength of the light source, $d$ is a period of the second diffraction grating, and $w$ is a width of the diffraction grating.

10. The optical encoder according to claim 1, further comprising a diffraction grating arranged between the light source and the scale,
wherein a divergent luminous flux from the light source converges to a side farther than a surface of the light receiving element array.

11. The optical encoder according to claim 1, further comprising a diffraction grating arranged between the scale and the light receiving element array.

12. The optical encoder according to claim 1,
wherein phases of the signal from the first light receiving element and the signal from the third light receiving element are different by 180 degrees, and
wherein phases of the signal from the second light receiving element and the signal from the fourth light receiving element are different by 180 degrees.

13. The optical encoder according to claim 1, wherein the light receiving element array includes a plurality of first light receiving elements adjacent to each other, a plurality of second light receiving elements adjacent to each other, a plurality of third light receiving elements adjacent to each other, and a plurality of fourth light receiving elements adjacent to each other.

14. A control apparatus comprising:
the optical encoder according to claim 1; and
a control unit configured to control displacement of an object based on a result of a detection made by the optical encoder.

15. The optical encoder according to claim 2,
wherein the diffraction grating includes a plurality of second diffraction gratings formed at predetermined intervals and adjacent to the first diffraction grating, and
wherein a region between the plurality of second diffraction gratings does not include a diffraction grating.

* * * * *